United States Patent
Stolfo et al.

(10) Patent No.: US 11,194,915 B2
(45) Date of Patent: Dec. 7, 2021

(54) METHODS, SYSTEMS, AND MEDIA FOR TESTING INSIDER THREAT DETECTION SYSTEMS

(71) Applicant: The Trustees of Columbia University in the City of New York, New York, NY (US)

(72) Inventors: Salvatore J. Stolfo, New York, NY (US); Preetam Kumar Dutta, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 226 days.

(21) Appl. No.: 16/498,847

(22) PCT Filed: Apr. 16, 2018

(86) PCT No.: PCT/US2018/027823
§ 371 (c)(1),
(2) Date: Sep. 27, 2019

(87) PCT Pub. No.: WO2019/018033
PCT Pub. Date: Jan. 24, 2019

(65) Prior Publication Data
US 2020/0104511 A1    Apr. 2, 2020

Related U.S. Application Data

(60) Provisional application No. 62/485,688, filed on Apr. 14, 2017.

(51) Int. Cl.
*G06F 21/57*     (2013.01)
*H04L 29/08*    (2006.01)

(52) U.S. Cl.
CPC ............ *G06F 21/577* (2013.01); *H04L 67/22* (2013.01); *H04L 67/306* (2013.01); *G06F 2221/034* (2013.01)

(58) Field of Classification Search
CPC . G06F 21/577; G06F 2221/034; H04L 67/22; H04L 67/306
See application file for complete search history.

(56) References Cited

U.S. PATENT DOCUMENTS 5,440,723 A   8/1995   Arnold et al.
5,621,889 A   4/1997   Lermuzeaux et al.
(Continued)

FOREIGN PATENT DOCUMENTS

KR   20130005301 A  *  1/2013  .......... G06F 21/577
KR   1020160064710     11/2014
(Continued)

OTHER PUBLICATIONS

Abou-Assaleh, T., et al., "Detection of New Malicious Code Using N-grams Signatures", In Proceedings of the Second Annual Conference on Privacy, Security and Trust (PST'04), Fredericton, NB, Canada, Oct. 13-15, 2004, pp. 193-196.
(Continued)

*Primary Examiner* — Arvin Eskandarnia
(74) *Attorney, Agent, or Firm* — Byrne Poh LLP

(57) ABSTRACT

Methods, systems, and media for testing insider threat detection systems are provided. In some embodiments, the method comprises: receiving, using a hardware processor, a first plurality of actions in a computing environment that are associated with one of a plurality of user accounts; generating a plurality of models of user behavior based at least in part on the first plurality of actions, wherein each of the plurality of models of user behavior is associated with each of the plurality of user accounts; selecting a model of user
(Continued)

behavior from the plurality of models of user behavior, wherein the model of user behavior is associated with a malicious user type; generating a simulated user bot based on the selected model of user behavior; executing the simulated user bot in the computing environment, wherein the simulated user bot injects a second plurality of actions in the computing environment; determining whether an insider threat detection system executing within the computing environment identifies the simulated user bot as a malicious user; and transmitting a notification indicating an efficacy of the insider threat detection system based on the determination.

18 Claims, 9 Drawing Sheets

(56) References Cited

U.S. PATENT DOCUMENTS

| | | |
|---|---|---|
| 5,796,952 A | 8/1998 | Davis et al. |
| 5,987,611 A | 11/1999 | Freund |
| 5,991,714 A | 11/1999 | Shanner |
| 6,108,799 A | 8/2000 | Boulay et al. |
| 6,405,318 B1 | 6/2002 | Rowland |
| 6,408,391 B1 | 6/2002 | Huff et al. |
| 6,671,811 B1 | 12/2003 | Diep et al. |
| 6,687,833 B1 | 2/2004 | Osborne et al. |
| 6,963,983 B2 | 11/2005 | Munson et al. |
| 6,981,279 B1 | 12/2005 | Arnold et al. |
| 7,069,316 B1 | 6/2006 | Gryaznov |
| 7,093,291 B2 | 8/2006 | Bailey |
| 7,152,242 B2 | 12/2006 | Douglas |
| 7,155,509 B1 | 12/2006 | Cordsmeyer et al. |
| 7,355,600 B2 | 4/2008 | Baraff et al. |
| 7,356,844 B2 | 4/2008 | Lyle et al. |
| 7,424,735 B2 | 9/2008 | Sorkin et al. |
| 7,428,484 B2 | 9/2008 | Yun et al. |
| 7,463,265 B2 | 12/2008 | Styles |
| 7,464,407 B2 | 12/2008 | Nakae et al. |
| 7,464,408 B1 | 12/2008 | Shah et al. |
| 7,475,405 B2 | 1/2009 | Manganaris et al. |
| 7,545,379 B2 | 6/2009 | Xie et al. |
| 7,603,709 B2 | 10/2009 | Lewis et al. |
| 7,624,448 B2 | 11/2009 | Coffman |
| 7,636,944 B2 | 12/2009 | Raikar |
| 7,673,147 B2 | 3/2010 | Moghe et al. |
| 7,716,181 B2 | 5/2010 | Todd |
| 7,788,071 B2 | 8/2010 | Bond et al. |
| 7,908,652 B1 | 3/2011 | Austin et al. |
| 7,984,100 B1 | 7/2011 | King et al. |
| 8,015,284 B1 | 9/2011 | Isenberg et al. |
| 8,122,505 B2 | 2/2012 | Verma |
| 8,161,550 B2 | 4/2012 | Keen et al. |
| 8,296,848 B1 | 10/2012 | Griffin et al. |
| 8,429,746 B2 | 4/2013 | Capalik |
| 8,479,288 B2 | 7/2013 | Martin et al. |
| 8,776,168 B1 | 7/2014 | Gibson et al. |
| 9,009,834 B1 | 4/2015 | Ren et al. |
| 9,117,078 B1 | 8/2015 | Chien et al. |
| 9,537,880 B1 * | 1/2017 | Jones .................. H04L 63/1433 |
| 2002/0035696 A1 | 3/2002 | Thacker |
| 2002/0066034 A1 | 5/2002 | Schlossberg et al. |
| 2002/0116635 A1 | 8/2002 | Sheymov |
| 2002/0184528 A1 | 12/2002 | Shevenell et al. |
| 2002/0197978 A1 | 12/2002 | Zavidniak |
| 2003/0065948 A1 | 4/2003 | Wilkes |
| 2003/0195852 A1 | 10/2003 | Campbell et al. |
| 2003/0219008 A1 | 11/2003 | Hrastar |
| 2004/0049693 A1 | 3/2004 | Douglas |
| 2004/0111632 A1 | 6/2004 | Halperin |
| 2004/0148521 A1 | 7/2004 | Cohen et al. |
| 2004/0162781 A1 | 8/2004 | Searl |
| 2004/0172557 A1 | 9/2004 | Nakae et al. |
| 2004/0260733 A1 | 12/2004 | Adelstein et al. |
| 2005/0071643 A1 | 3/2005 | Moghe |
| 2005/0114363 A1 | 5/2005 | Borthakur et al. |
| 2005/0166072 A1 | 7/2005 | Converse et al. |
| 2005/0172115 A1 | 8/2005 | Bodorin et al. |
| 2005/0188272 A1 | 8/2005 | Bodorin et al. |
| 2005/0265311 A1 | 12/2005 | Stolfo et al. |
| 2005/0281291 A1 | 12/2005 | Stolfo et al. |
| 2006/0015630 A1 | 1/2006 | Stolfo et al. |
| 2006/0085854 A1 | 4/2006 | Agrawal et al. |
| 2006/0123083 A1 | 6/2006 | Goutte et al. |
| 2006/0242694 A1 | 10/2006 | Gold et al. |
| 2006/0253578 A1 | 11/2006 | Dixon et al. |
| 2006/0265750 A1 | 11/2006 | Huddleston |
| 2007/0101430 A1 | 5/2007 | Raikar |
| 2007/0157289 A1 | 7/2007 | Newton et al. |
| 2007/0162548 A1 | 7/2007 | Bilkhu et al. |
| 2007/0240207 A1 | 10/2007 | Belakhdar et al. |
| 2007/0250930 A1 | 10/2007 | Aziz et al. |
| 2007/0271614 A1 | 11/2007 | Capalik |
| 2007/0283434 A1 | 12/2007 | Cohen et al. |
| 2007/0283435 A1 | 12/2007 | Cohen et al. |
| 2007/0289018 A1 | 12/2007 | Steeves et al. |
| 2007/0291043 A1 | 12/2007 | Bruderlin et al. |
| 2008/0022400 A1 | 1/2008 | Cohen et al. |
| 2008/0047009 A1 | 2/2008 | Overcash et al. |
| 2008/0235299 A1 | 9/2008 | Haselton et al. |
| 2009/0007270 A1 | 1/2009 | Futoransky et al. |
| 2009/0028135 A1 | 1/2009 | Mantripragada et al. |
| 2009/0044042 A1 | 2/2009 | Fujiwara et al. |
| 2009/0083855 A1 | 3/2009 | Apap et al. |
| 2009/0144823 A1 | 6/2009 | Lamastra et al. |
| 2009/0222920 A1 | 9/2009 | Chow et al. |
| 2009/0227281 A1 | 9/2009 | Hammad et al. |
| 2009/0241191 A1 | 9/2009 | Keromytis et al. |
| 2009/0292696 A1 | 11/2009 | Shuster |
| 2009/0292743 A1 | 11/2009 | Bigus et al. |
| 2009/0293121 A1 | 11/2009 | Bigus et al. |
| 2009/0328216 A1 | 12/2009 | Rafalovich et al. |
| 2010/0046790 A1 | 2/2010 | Koziol et al. |
| 2010/0064370 A1 | 3/2010 | Thiebeauld de la Crouee et al. |
| 2010/0077483 A1 | 3/2010 | Stolfo et al. |
| 2010/0132038 A1 | 5/2010 | Zaitsev |
| 2010/0269175 A1 | 10/2010 | Stolfo et al. |
| 2011/0010470 A1 | 1/2011 | Hulbert et al. |
| 2011/0093630 A1 | 4/2011 | Arnholt, Jr. et al. |
| 2011/0167493 A1 | 7/2011 | Song et al. |
| 2011/0167494 A1 | 7/2011 | Bowen et al. |
| 2012/0084866 A1 | 4/2012 | Stolfo |
| 2013/0055404 A1 | 2/2013 | Khalili |
| 2015/0235152 A1 | 8/2015 | Eldardiry et al. |
| 2015/0286819 A1 | 10/2015 | Coden et al. |
| 2016/0191559 A1 | 6/2016 | Mhatre et al. |

FOREIGN PATENT DOCUMENTS

| | | |
|---|---|---|
| WO | WO 2007143011 | 12/2007 |
| WO | WO 2008041915 | 10/2008 |
| WO | WO 2008133762 | 11/2008 |
| WO | WO 2009032379 | 3/2009 |
| WO | WO 2016097998 | 6/2016 |
| WO | WO 2017019391 | 2/2017 |

OTHER PUBLICATIONS

Abou-Assaleh, T., et al., "N-Gram-Based Detection of New Malicious Code", In Proceedings of the 28th International Computer Software and Applications Conference (COMPSAC '04), Hong Kong, CN, Sep. 28-30, 2004, pp. 41-42.

Aha, D.W., et al., "Instance-Based Learning Algorithms", In Machine Learning, vol. 6, No. 1, Jan. 1991, pp. 37-66.

Akritidis, P., et al., "Proximity Breeds Danger: Emerging Threats in Metro-Area Wireless Networks", In Proceedings of the 16th USENIX Security Symposium, Boston, MA, US, Aug. 6-10, 2007, pp. 323-338.

Alzantot, M., et al., "SenseGen: A Deep Learning Architecture for Synthetic Sensor Data Generation", Technical Report, Cornell Uni-

(56) References Cited

OTHER PUBLICATIONS versity, Jan. 31, 2017, pp. 1-7, available at: http://arxiv.org/abs/1701.08886.
Arbaugh, W.A., "Chaining Layered Integrity Checks", PhD Thesis, University of Pennsylvania, Jan. 1999, pp. 1-118.
Arbaugh, W.A., et al., "A Secure and Reliable Bootstrap Architecture", In Proceedings of the IEEE Security and Privacy Conference, Oakland, CA, US, May 4-7, 1997, pp. 65-71.
Attenberg, J., et al., "Modeling and Predicting User Behavior in Sponsored Search", In Proceedings of the 15th ACM SIGKDD International Conference on Knowledge Discovery and Data Mining (KDD '09), Paris, FR, Jun. 28-Jul. 1, 2009, pp. 1067-1076.
Baeza-Yates, R., et al., "Modeling User Search Behavior", In Proceedings of the 3rd Latin American Web Congress (LA-WEB '05), Buenos Aires, AR, Oct. 31-Nov. 2, 2005, pp. 242-251.
Bahrololum, M. and Khaleghi, M., "Anomaly Intrustion Detection System Using Gaussian Mixture Model", In Proc. of the 3rd Intl. Conf. on Convergence and Hybrid Information Technology, Busan, KR, Nov. 11-13, 2008, pp. 1162-1167.
Bailey, M., et al., "The Blaster Worm: Then and Now", In IEEE Security & Privacy, vol. 3, No. 4, Aug. 8, 2005, pp. 26-31.
Balajinath, B. and Raghavan, S.V., "Intrusion Detection Through Learning Behavior Model", In Computer Communications, vol. 24, No. 12, Jul. 2001, pp. 1202-1212.
Balenson, D., et al., "Cybersecurity Experimentation of the Future", Technical Report, University of Southern California, Jul. 2015, pp. 1-3.
Barham, P., et al., "Xen and the Art of Virtualization", In Proceedings of the 19th ACM Symposium on Operating Systems Principles (SOSP '03), Bolton Landing, NY, US, Oct. 19-22, 2003, pp. 164-177.
Beck, M. and Tews, E., "Practical Attacks Against WEP and WPA", In Proceedings of the 2nd Annual ACM Conference on Wireless Network Security, Zurich, CH, Mar. 16-18, 2009, pp. 79-85.
Bell, D.E. and LaPadula, L.J., "Secure Computer Systems: Mathematical Foundations and Model", Technical Report ESD-TR-74-244, Mitre Corp, Bedford, MA, US, Nov. 1973, pp. 1-33.
Bellard, F., "QEMU, a Fast and Portable Dynamic Translator", In Proceedings of the USENIX Annual Technical Conference, Anaheim, CA, US, Apr. 10-15, 2005, pp. 41-46.
Ben-Gal, I., "Bayesian Networks", John Wiley & Sons, Ltd., Mar. 15, 2008, pp. 1-6, available at: http://dx.doi.org/10.1002/9780470061572.eqr089.
Bittau, A., et al., "The Final Nail in WEP's Coffin", In Proceedings of the 2006 IEEE Symposium on Security and Privacy (S&P '06), Berkeley, CA, US, May 21-24, 2006, pp. 386-400.
Bloom, B.H., "Space/Time Trade-Offs in Hash Coding with Allowable Errors", In Communications of the ACM, vol. 13, No. 7, Jul. 1970, pp. 422-426.
Boggs, N., et al., "Measuring Drive-by Download Defense in Depth", In Proceedings of the 17th International Symposium on Research in Attacks, Intrusions, and Defenses, Gothenburg, SE, Sep. 17-19, 2014, pp. 172-191.
Boggs, N., et al., "Synthetic Data Generation and Defense in Depth Measurement of Web Applications", In Proc. of the 17th Intl. Symposium on Research in Attacks, Intrusions and Defenses, Lecture Notes in Computer Science, Gothenburg, SE, Sep. 17-19, 2014, pp. 234-254.
Bond, M., and Danezis, G., "A Pact with the Devil", In Proceedings of the New Security Paradigms Workshop, Wadern, DE, Sep. 19-22, 2006, pp. 78-85.
Borders, K., et al., "Siren: Catching Evasive Malware", In Proceedings of the IEEE Symposium on Security and Privacy, Oakland, CA, US, May 21-24, 2006, pp. 78-85.
Bowen, B.M., et al., "Automating the Injection of Believable Decoys to Detect Snooping", In Proceedings of the 3rd ACM Conference on Wireless Network Security, Hoboken, NJ, US, Mar. 22-24, 2010, pp. 81-86.
Bowen, B.M., et al., "Baiting Inside Attackers Using Decoy Documents", In Proceedings of the 5th International ICST Conference on Security and Privacy in Communication Networks (SecureComm '09), Athens, GR, Sep. 14-18, 2009, pp. 51-70.
Bowen, B.M., et al., "Botswindler: Tamper Resistant Injection of Believable Decoys in VM-Based Hosts for Crimeware Detection", In Proceedings of the International Workshop on Recent Advances in Intrusion Detection, Ottawa, Ontario, Canada, Sep. 15-17, 2010, pp. 118-137.
Bowen, B.M., et al., "Designing Host and Network Sensors to Mitigate the Insider Threat", In IEEE Security & Privacy Magazine, vol. 7, No. 6, Nov. 6, 2009, pp. 22-29.
Braje, T.M., "Advanced Tools for Cyber Ranges", In Lincoln Laboratory Journal, vol. 22, No. 1, Nov. 2016, pp. 24-32.
Butler, J. and Sparks, S., "Spyware and Rootkits: The Future Convergence", In Login, vol. 29, No. 6, Dec. 2004, pp. 8-15.
Casey, W., et al., "Compliance Signaling Games: Toward Modeling the Deterrence of Insider Threats", In Computational and Mathematical Organization Theory, vol. 22, No. 3, Sep. 2016, pp. 318-349.
CERT, "'Code Red' Worm Exploiting Buffer Overflow in IIS Indexing Service DLL", Technical Report, CERT Advisory CA-2001-19, Jul. 19, 2001, pp. 1-3, available at: http://www.cert.org/advisories/CA-2001-19.html.
CERT, "MS-SQL Server Worm", Technical Report, last updated Jan. 25, 2003, pp. 1-3, available at: http://www.cert.org/advisories/CA-2003-04.html.
CERT, "Nimda Worm", Technical Report, CERT Advisory CA-2001-26, Sep. 18, 2001, pp. 1-5, available at: http://www.cert.org/advisories/CA-2001-26.html.
CERT, "W32/Blaster Worm", Technical Report, CERT Advisory CA-2003-20, Aug. 14, 2003, pp. 1-3, available at: http://www.cert.org/advisories/CA-2003-20.html.
Chandrasekaran, M., et al., "SpyCon: Emulating User Activities to Detect Evasive Spyware", In Proceedings of the Performance, Computing, and Communications Conference, New Orleans, LA, US, Apr. 11-13, 2007, pp. 502-509.
Chang, C.C. and Lin, C.J., "LIBSVM: a Library for Support Vector Machines", Technical Report, National Taiwan University, Mar. 4, 2013, pp. 1-39, available at: http://www.csie.ntu.tv/cjlin/libsvm.pdf.
Chen, P.M. and Noble, B.D., "When Virtual is Better Than Real", In Proceedings of the 8th Workshop on Hot Topics in Operating System (HotOS '01), Elmau/Oberbayern, DE, May 20-23, 2001, pp. 133-138.
Cheswick, B., "An Evening with Berferd in Which a Cracker is Lured, Endured, and Studied", Technical Report, AT&T Bell Laboratories, Jan. 7, 1991, pp. 1-11, available at: www.cheswick.com/ches/papers/berferd.pdf.
Chinchani, R., et al., "RACOON: Rapidly Generating User Command Data for Anomaly Detection from Customizable Templates", In Proceedings of the 20th Annual Computer Security Applications Conference (ACSAC '04), Tucson, AZ, US, Dec. 6-10, 2004, pp. 189-204.
Chou, N., et al., "Client-Side Defense Against Web-Based Identity Theft", In Proceedings of the ISOC Symposium on Network and Distributed Systems Security (NDSS '04), San Diego, CA, US, Feb. 5-6, 2004, pp. 1-16.
Christodorescu, M. and Jha, S., "Static Analysis of Executables to Detect Malicious Patterns", In Proceedings of the 12th USENIX Security Symposium (SSYM '03), Washington, DC, US, Aug. 4-8, 2003, pp. 169-186.
Christodorescu, M. and Jha, S., "Testing Malware Detectors", In Proceedings of the ACM SIGSOFT International Symposium on Software Testing and Analysis (ISSTA'04), Boston, MA, US, Jul. 11-14, 2004, pp. 34-44.
Clark, D.D. and Wilson, D.R., "A Comparison of Commercial and Military Computer Security Policies", In Proceedings of the IEEE Symposium on Security and Privacy (S&P '87), Oakland, CA, US, Apr. 27-29, 1987, pp. 184-194.
Cortes, C. and Vapnik, V., "Support-Vector Networks", In Machine Learning, vol. 20, No. 3, 1995, pp. 273-297, available at: http://dx.doi.org/10.1023/A:1022627411411.

(56) References Cited

OTHER PUBLICATIONS

Costa, P.C.G., et al., "DTB Project: A Behavioral Model for Detecting Insider Threats", In Proceedings of the International Conference on Intelligence Analysis, McLean, VA, US, May 2-6, 2005, pp. 1-6.

Coull, S., et al., "Intrusion Detection: A Bioinformatics Approach", In Proceedings of the 19th Annual Computer Security Applications Conference (ACSAC '03), Las Vegas, NV, US, Dec. 8-12, 2003, pp. 24-33.

Coull, S.E. and Szymanski, B.K., "Sequence Alignment for Masquerade Detection", In Computational Statistics & Data Analysis, vol. 52, No. 8, Apr. 15, 2008, pp. 4116-4131.

Cover, T.M. and Hart, P.E., "Nearest Neighbor Pattern Classification", In IEEE Transactions on Information Theory, vol. 13, No. 1, Jan. 1967, pp. 21-27.

Cracknell, P., et al., "The Wireless Security Survey of New York City", Technical Report, RSA, The Security Division of EMC, Oct. 2008, pp. 1-9.

Cui, W., et al., "Protocol-Independent Adaptive Replay of Application Dialog", In Proceedings of the 13th Symposium on Network and Distributed System Security (NDSS '06), San Diego, CA, US, Feb. 2-3, 2006, pp. 1-15.

Cully, B., et al., "Remus: High Availability via Asynchronous Virtual Machine Replication", In Proceedings of the USENIX Symposium on Networked Systems Design and Implementation (NSDI '08), San Francisco, CA, US, Apr. 16-18, 2008, pp. 161-174.

Dagon, D., et al., "HoneyStat: Local Worm Detection Using Honeypots", In Proceedings of the 7th International Symposium on Recent Advances in Intrusion Detection (RAID '04), Sophia Antipolis, FR, Sep. 15-17, 2004, pp. 39-58.

Damashek, M., "Gauging Similarity with N-Grams: Language-Independent Categorization of Text", In Science, vol. 267, No. 5199, Feb. 10, 1995, pp. 843-848.

Dark Reading, "Researcher Uncovers Massive, Sophisticated Trojan Targeting Top Businesses", Darkreading, Jul. 29, 2009, pp. 1-2, available at: http://www.darkreading.com/database_security/security/privacy/showArticle.jhtml?articleID=218800077.

Dash, S.K., et al., "Masquerade Detection Using IA Network", In Proceedings of the 1st International Workshop on Applications of Constraint Satisfaction and Programming to Computer Security Problems (CPSec '05), Sitges, ES, Oct. 1, 2005, pp. 18-30.

Davison, B.D. and Hirsh, H., "Predicting Sequences of User Actions", In Proceedings of the Workshop on Predicting the Future: AI Approaches to Time-Series Problems, Madison, WI, US, Jul. 27, 1998, pp. 5-12.

Davison, B.D. and Hirsh, H., "Toward an Adaptive Command Line Interface", In Proceedings of the Seventh International Conference on Human-Computer Interaction (HCI '97), San Francisco, CA, US, Aug. 24-29, 1997, pp. 505-508.

De Maesschalck, R., et al., "The Mahalanobis Distance", In Chemometrics and Intelligent Laboratory Systems, vol. 50, No. 1, Jan. 4, 2000, pp. 1-18.

Demers, A., et al., "Cayuga: A General Purpose Event Monitoring System", In Proceedings of the Third Biennial Conference on Innovative Data Systems Research (CIDR '07), Asilomar, CA, US, Jan. 7-10, 2007, pp. 412-422.

Detristan, T., et al., "Polymorphic Shellcode Engine Using Spectrum Analysis", In Phrack, vol. 61, Aug. 13, 2003, pp. 1-25, available at: http://www.phrack.org/issues.html?issue=61&id=9.

Dhamija, R., et al., "Why Phishing Works", In Proceedings of the 2006 Conference on Human Factors in Computing Systems (CHI '06), Montreal, Quebec, Canada, Apr. 22-27, 2006, pp. 581-590.

Dovrolis, C., et al., "Packet-Dispersion Techniques and a Capacity-Estimation Methodology", In IEEE/ACM Transactions on Networking, vol. 12, No. 6, Dec. 2004, pp. 963-977.

Dubendorfer, T., et al., "Flow-Level Traffic Analysis of the Blaster and Sobig Worm Outbreaks in an Internet Backbone", In Proceedings of the Conference on Detection of Intrusions and Malware & Vulnerability Assessment (DIMVA'05), Vienna, AT, Jul. 7-8, 2005, pp. 103-122.

DuMouchel, W., "Computer Intrusion Detection Based on Bayes Factors for Comparing Command Transition Probabilities", Technical Report TR91, National Institute of Statistical Sciences, Feb. 1999, pp. 1-14.

Eberle, W., et al., "Insider Threat Detection using a Graph-Based Approach", In Journal of Applied Security Research, vol. 6, No. 1, Dec. 2010, pp. 32-81, available at: http://dx.doi.org/10.1080/19361610.2011.529413.

Egele, M., et al., "Dynamic Spyware Analysis", In Proceedings of the USENIX Annual Technical Conference, Santa Clara, CA, US, Jun. 17-22, 2007, pp. 233-246.

Energy Science Network, "Iperf3", last accessed Mar. 17, 2017, pp. 1-2, available at: http://software.es.net/iperf/.

Ferguson, B.C., et al., "National Cyber Range Overview", In Proceedings of the 2014 IEEE Military Communications Conference, Baltimore, MD, US, Oct. 6-8, 2014, pp. 123-128.

Forrest, S., et al., "A Sense of Self for Unix Processes", In Proceedings of the IEEE Symposium on Security and Privacy (S&P '96), Oakland, CA, US, May 6-8, 1996, pp. 120-128.

Frias-Martinez, V., et al., "Behavior-Based Network Access Control: A Proof-of-Concept", In Proceedings of the 11th Information Security Conference (ISC '08), Taipei, TW, Sep. 15-18, 2008, pp. 175-190.

Friess, N. and Aycock, J., "Black Market Botnets", Technical Report 2007-873-25, University of Calgary, Jul. 2007, pp. 1-4.

Garfinkel, T. and Rosenblum, M., "A Virtual Machine Introspection Based Architecture for Intrusion Detection", In Proceedings of the 10th Network and Distributed System Security Symposium (NDSS '03), San Diego, CA, US, Feb. 6-7, 2003, pp. 191-206.

Garfinkel, T., et al., "Compatibility is Not Transparency: VMM Detection Myths and Realities", In Proceedings of the 11th USENIX Workshop on Hot Topics in Operating Systems (HotOS '07), San Diego, CA, US, May 7-9, 2007, pp. 1-6.

Gartner, "Market Guide for User and Entity Behavior Analytics", Sep. 22, 2015, pp. 1-4, available at: https://www.gartner.com/doc/3134524/market-guide-user-entity-behavior.

Gheyas, I.A. and Abdallah, A.E., "Detection and Prediction of Insider Threats to Cyber Security: A Systematic Literature Review and Meta-Analysis", In Big Data Analytics, vol. 1, No. 6, Dec. 2016, pp. 1-29.

Ghosh, A.K., et al., "Learning Program Behavior Profiles for Intrusion Detection", In Proceedings of the Workshop on Intrusion Detection and Network Monitoring, Santa Clara, CA, US, Apr. 9-12, 1999, pp. 51-62.

Glasser, J. and Lindauer, B., "Bridging the Gap: A Pragmatic Approach to Generating Insider Threat Data", In Proceedings of the 2013 IEEE Security and Privacy Workshops, San Francisco, CA, US, May 23-24, 2013, pp. 1-7.

Goel, S. and Bush, S.F., "Kolmogorov Complexity Estimates for Detection of Viruses in Biologically Inspired Security Systems: A Comparison with Traditional Approaches", In Complexity Journal, vol. 9, No. 2, Nov.-Dec. 2003, pp. 54-73.

Goldring, T., "User Profiling for Intrusion Detection in Windows NT", In Proceedings of the 35th Symposium on the Interface: Computing Science and Statistics, Salt Lake City, UT, US, Mar. 12-15, 2003, pp. 524-527.

Gordon, L.A., et al., "CSI/FBI Computer Crime and Security Survey", Computer Security Institute, Jul. 2006, pp. 1-27, available at: http://gocsi.com/SurveyArchive.

Graham, R.D., "SideJacking with Hamster", Technical Report, Errata Security, Aug. 5, 2007, pp. 1-11, available at: http://erratasec.blogspot.com/2007/08/sidejacking-with-hamster_05.html.

Hall, M., et al., "The WEKA Data Mining Software: An Update", In ACM SIGKDD Explorations Newsletter, vol. 11, No. 1, Jun. 2009, pp. 10-18.

Harmon, D., et al., "Robust Treatment of Simultaneous Collisions", In SIGGRAPH ACM Transactions on Graphics, vol. 27, No. 3, Aug. 2008, pp. 1-4.

Higgins, K.J., "Up to 9 Percent of Machines in an Enterprise are Bot-Infected", Darkreading, Sep. 24, 2009, pp. 1-2, available at: http://www.darkreading.com/insiderthreat/security/client/showArticle.jhtml?articleID=220200118.

(56) References Cited

OTHER PUBLICATIONS

Hirschberg, D.S., "A Linear Space Algorithm for Computing Maximal Common Subsequences", In Communications of the ACM, vol. 18, No. 6, Jun. 1975, pp. 341-343.
Ho, S.M. and Warkentin, M., "Leader's Dilemma Game: An Experimental Design for Cyber Insider Threat Research", In Information Systems Frontiers, vol. 19, No. 2, Apr. 2017, pp. 377-396.
Hoang, M., "Handling Today's Tough Security Threats", In Symantec Official Blog, Nov. 2, 2006, pp. 1-2, available at: http://www.symantec.com/connect/blogs/handling-todays-tough-security-threats-rootkits.
Holz, T., "A Short Visit to the Bot Zoo", In IEEE Security & Privacy, vol. 3, No. 3, May/Jun. 2005, pp. 76-79.
Holz, T., et al., "Learning More About the Underground Economy: A Case-Study of Keyloggers and Dropzones", In Proc. of the 14th European Symposium on Research in Computer Security (ESORICS '09), Saint-Malo, FR, Sep. 21-23, 2009, pp. 1-18.
Hong, S.S. and Wu, S.F., "On Interactive Internet Traffic Replay", In Proceedings of the 8th International Symposium on Recent Advances in Intrusion Detection (RAID '05), Seattle, WA, US, Sep. 7-9, 2005, pp. 247-264.
Ilett, D., "Trojan Attacks Microsoft's Anti-Spyware", CNET News, Feb. 9, 2005, pp. 1-3, available at: http://news.cnet.com/Trojan-attacks-Microsofts-anti-spyware/2100-7349_3-5569429.html.
International Search Report and Written Opinion dated Jan. 8, 2019 in International Patent Application No. PCT/US2018/027823, pp. 1-15.
International Search Report dated Feb. 13, 2009 in International Patent Application No. PCT/US2008/066623, pp. 1.
International Search Report dated Jul. 17, 2008 in International Patent Application No. PCT/US2007/012811, pp. 1-9.
Jagatic, T., et al., "Social Phishing", Technical Report, Indiana University, Dec. 12, 2005, pp. 1-10.
Jha, S., et al., "A Filtering Approach to Anomaly and Masquerade Detection", Technical Report, University of Wisconsin, 2004, pp. 1-21.
Jiang, X. and Wang, X., "'Out-of-the-Box' Monitoring of VM-Based High-Interaction Honeypots", In Proceedings of the 10th International Symposium on Recent Advances in Intrusion Detection (RAID '07), Gold Goast, AU, Sep. 5-7, 2007, pp. 198-218.
Jones, A.K. and Sielken, R.S., "Computer System Intrusion Detection: A Survey", Technical Report, University of Virginia, Feb. 9, 2000, pp. 1-25.
Jones, R., "Welcome to the Netperf Homepage", Netperf, last accessed Mar. 21, 2017, pp. 1, available at: https://web.archive.org/web/20170321153813/http://www.netperf.org/netperf/.
Jones, S.T., et al., "Antfarm: Tracking Processes in a Virtual Machine Environment", In Proceedings of the USENIX Annual Technical Conference, Boston, MA, US, May 30-Jun. 3, 2006, pp. 1-14.
Ju, W.H. and Vardi, Y., "A Hybrid High-Order Markov Chain Model for Computer Intrusion Detection", Technical Report No. 92, National Institute of Statistical Sciences, Feb. 1999, pp. 1-24.
Kandias, M., et al., "An Insider Threat Prediction Model", In Proceedings of the International Conference on Trust, Privacy and Security in Digital Business, Bilbao, ES, Aug. 30-31, 2010, pp. 26-37.
Karim, M.E., et al., "Malware Phylogeny Generation using Permutations of Code", In Journal in Computer Virology, vol. 1, No. 1-2, Nov. 2005, pp. 13-23.
Kepner, J., et al., "Percolation Model of Insider Threats to Assess the Optimum Number of Rules", In Environment Systems and Decisions, vol. 35, No. 4, Dec. 2015, pp. 504-510.
Killourhy, K. and Maxion, R.A., "Investigating a Possible Flaw in a Masquerade Detection System", Technical Report CS-TR-896, Newcastle University, Nov. 2004, pp. 1-11.
Killourhy, K.S. and Maxion, R.A., "Comparing Anomaly-Detection Algorithms for Keystroke Dynamics", In IEEE/IFIP International Conference on Dependable Systems & Networks (DSN '09), Lisbon, PT, Jun. 29-Jul. 2, 2009, pp. 125-134.
Klimt, B. and Yang, Y., "Introducing the Enron Corpus", In Proceedings of the 3rd Conference on Email and Anti-Spam (CEAS '06), Mountain View, CA, US, Jul. 27-28, 2006, pp. 1-2.
Kolesnikov, O. and Lee, W., "Advanced Polymorphic Worms: Evading IDS by Blending in with Normal Traffic", Technical Report GIT-CC-04-15, Georgia Institute of Technology, 2004, pp. 1-22.
Kravets, D., "From Riches to Prison: Hackers Rig Stock Prices", Wired Blog Network, Sep. 8, 2008, pp. 1-6, available at: www.wired.com/threatlevel/2008/09/from-riches-to/.
Krebs, B., "Web Fraud 2.0: Validating Your Stolen Goods", The Washington Post, Aug. 20, 2008, pp. 1-5, available at: http://voices.washingtonpost.com/securityfix/2008/08/web_fraud_20_try_before_you_bu.html.
Lane, T. and Bradley, C.E., "Sequence Matching and Learning in Anomaly Detection for Computer Security", In Proceedings of the Workshop on AI Approaches to Fraud Detection and Risk Management (AAAI-97), Providence, RI, US, Jul. 27-31, 1997, pp. 43-49.
Laskey, K., et al., "Detecting Threatening Behavior Using Bayesian Networks", In Proceedings of the 13th Conference on Behavior Representation in Modeling and Simulation (BRIMS '04), Arlington, VA, US, May 17-20, 2004, pp. 136-145.
Lee, W. and Xiang, D., "Information-Theoretic Measures for Anomaly Detection", In Proceedings of the IEEE Symposium on Security and Privacy (S&P '01), Oakland, CA, US, May 14-16, 2001, pp. 130-143.
Li, L. and Manikopoulos, C.N., "Windows NT One-Class Masquerade Detection", In Proceedings of the 5th Annual IEEE Workshop on Information Assurance, West Point, NY, US, Jun. 10-11, 2004, pp. 82-87.
Li, M., et al., "WBest: A Bandwidth Estimation Tool for Multimedia Streaming Application over IEEE 802.11 Wireless Networks", In Proc. of the 33rd IEEE Conf. on Local Computer Networks (LCN '08), Montreal, Quebec, Canada, Oct. 14-17, 2008, pp. 374-381.
Li, T. and Liu, J., "Cluster-Based Spatiotemporal Background Traffic Generation for Network Simulation", In ACM Trans. Model. Comput. Simul., vol. 25, No. 1, Nov. 2014, pp. 1-25, available at: http://doi.acm.org/10.1145/2667222.
Li, W.J., et al., "A Study of Malcode-Bearing Documents", In Proc. of the 4th Intl. Conf. on Detection of Intrusions and Malware, and Vulnerability Assessment (DIMVA'07), Lucerne, CH, Jul. 12-13, 2007, pp. 231-250.
Li, W.J., et al., "Fileprints: Identifying File Types by N-Gram Analysis", In Proceedings of the 6th Annual IEEE SMC Information Assurance Workshop (IAW'05), West Point, NY, US, Jun. 15-17, 2005, pp. 64-71.
Lindahl, G., "MS Outlook to Unix Mailbox Conversion Mini How-To", Jan. 8, 2004, pp. 1-8, available at: http://tldp.org/HOWTO/pdf/Outlook-to-Unix-Mailbox.pdf.
Lippmann, R., et al., "Analysis and Results of the 1999 DARPA Off-Line Intrusion Detection Evaluation", In Lecture Notes in Computer Science Recent Advances in Intrusion Detection, 2000, pp. 162-182.
Lippmann, R.P., et al., "Evaluating Intrusion Detection Systems: The 1998 DARPA Off-Line Intrusion Detection Evaluation", In Proc. of the DARPA Information Survivability Conf. and Exposition (DISCEX'00), Hilton Head, SC, US, Jan. 25-27, 2000, pp. 12-26.
Mahoney, M.V. and Chan, P.K., "Learning Nonstationary Models of Normal Network Traffic for Detecting Novel Attacks", In Proc. of the 8th Assoc. for Computing Machinery Special Interest Group on Knowledge Discovery and Data Mining (KDD '02), Edmonton, AB, Canada, Jul. 23-26, 2002, pp. 376-385.
Maloof, M.A. and Stephens, G.D., "ELICIT: A System for Detecting Insiders Who Violate Need-to-Know", In Proceedings of the 10th International Conference on Recent Advances in Intrusion Detection (RAID '07), Gold Coast, AU, Sep. 5-7, 2007, pp. 146-166.
Maxion, R.A. and Townsend T.N., "Masquerade Detection Using Truncated Command Lines", In Proceedings of the International Conference on Dependable Systems & Networks (DSN '02), Bethesda, MD, US, Jun. 23-26, 2002, pp. 219-228.

(56) References Cited

OTHER PUBLICATIONS

Maxion, R.A. and Townsend, T.N., "Masquerade Detection Augmented with Error Analysis", In IEEE Transactions on Reliability, vol. 53, No. 1, Mar. 2004, pp. 124-147.
Maxion, R.A., "Masquerade Detection Using Enriched Command Lines", In Proceedings of the International Conference on Dependable Systems & Networks (DSN '03), San Francisco, CA, US, Jun. 22-25, 2003, pp. 5-14.
Maybury, M., et al., "Analysis and Detection of Malicious Insiders", In Proceedings of the International Conference on Intelligence Analysis, McLean, VA, US, May 2-3, 2005, pp. 1-5.
McCall, T., "Gartner Survey Shows Phishing Attacks Escalated in 2007; More than $3 Billion Lost to These Attacks", Gartner, Dec. 17, 2009, pp. 1-3, available at: http://www.gartner.com/it/page.jsp?id=565125.
McDaniel, M. and Heydari, M.H., "Content Based File Type Detection Algorithms", In Proceedings of the 36th Annual Hawaii International Conference on System Sciences (HICSS '03), Big Island, HI, US, Jan. 6-9, 2003, pp. 1-10.
McGlasson, L., "TJX Update: Breach Worse Than Reported", Technical Report, Bank Info Security, Oct. 26, 2007, pp. 1-4, available at: http://www.bankinfosecurity.com/tjx-update-breach-worse-than-reported-a-606.
McHugh, J., "Testing Intrusion Detection Systems: A Critique of the 1998 and 1999 DARPA Intrusion Detection System Evaluations as Performed by Lincoln Laboratory", In ACM Trans. Inf. Syst. Secur., vol. 3, No. 4, Nov. 2000, pp. 262-294.
McRae, C.M. and Vaughn, R.B., "Phighting the Phisher: Using Web Bugs and Honeytokens to Investigate the Source of Phishing Attacks", In Proceedings of the 40th Annual Hawaii International Conference on System Sciences (HICSS '07), Waikoloa, Big Island, HI, US, Jan. 3-6, 2007, pp. 1-7.
Medina, A., et al., "Traffic Matrix Estimation: Existing Techniques and New Directions", In Proceedings of the ACM SIGCOMM Computer Communication Review (SIGCOMM '02), Pittsburgh, PA, US, Aug. 19-23, 2002, pp. 161-174.
Messmer, E., "America's 10 Most Wanted Botnets", Network World, Jul. 22, 2009, pp. 1-3, available at: http://www.networkworld.com/news/2009/072209-botnets.html.
Michael, J.B., et al., "Software Decoys: Intrusion Detection and Countermeasures", In Proceedings of the IEEE Workshop on Information Assurance (IAW '02), West Point, NY, US, Jun. 17-19, 2002, pp. 130-138.
Microsoft, "Microsoft Security Advisory 912840: Vulnerability in Graphics Rendering Engine Could Allow Remote Code Execution", Technical Report, Jan. 5, 2006, pp. 1-2, available at: http://www.microsoft.com/technet/security/advisory/912840.mspx.
Monrose, F. and Rubin, A., "Authentication via Keystroke Dynamics", In Proceedings of the 4th ACM Conference on Computer and Communications Security (CCS '97), Zurich, CH, Apr. 1-4, 1997, pp. 48-56.
Monterio Jr., V., "How Intrusion Detection Can Improve Software Decoy Applications", Master's Thesis, Naval Postgraduate School, Mar. 2003, pp. 1-69.
Montgomery, A.L., et al., "Modeling Online Browsing and Path Analysis using Clickstream Data", In Marketing Science, vol. 23, No. 4, Nov. 2004, pp. 579-295.
Moore, D., et al., "Code-Red: A Case Study on the Spread and Victims of an Internet Worm", In Proceedings of the 2nd Internet Measurement Workshop (IMW '02), Marseille, FR, Nov. 6-8, 2002, pp. 273-284.
Morse, A., "Google's Gmail Service Suffers Another Shutdown", Wall Street Journal, Mar. 11, 2009, pp. 1-4, available at: http://online.wsj.com/article/SB123673492963090721 .html.
Moshchuk, A., et al., "A Crawler-Based Study of Spyware in the Web", In Proceedings of the ISOC Symposium on Network and Distributed System Security (NDSS '06), San Diego, CA, US, Feb. 2-3, 2006, pp. 1-17.
Naor, M. and Yung, M., "Universal One-Way Hash Functions and their Cryptographic Applications", In Proceedings of the 21st Annual ACM Symposium on Theory of Computing (STOC '89), Seattle, WA, US, May 14-17, 1989, pp. 33-43.
Nguyen, N. and Reiher, P., "Detecting Insider Threats by Monitoring System Call Activity", In Proceedings of the Man and Cybernetics Society Information Assurance Workshop (IAW '03), West Point, NY, US, Jun. 18-20, 2003, pp. 45-52.
Noga, A.J., "A Visual Data Hash Method", Technical Report, Air Force Research Laboratory, Oct. 2004, pp. 1-23.
Notice of Allowance dated Jan. 3, 2018 in U.S. Appl. No. 13/965,619, pp. 1-19.
Notice of Allowance dated Apr. 29, 2013 in U.S. Appl. No. 12/982,984, pp. 1-41.
Notice of Allowance dated Sep. 14, 2017 in U.S. Appl. No. 13/965,619, pp. 1-75.
Notice of Allowance dated Nov. 30, 2015 in U.S. Appl. No. 14/272,099, pp. 1-66.
Notice of Allowance dated Dec. 23, 2013 in U.S. Appl. No. 12/628,587, pp. 1-92.
O'Brien, M. and Keane, M.T., "Modeling User Behavior Using a Search Engine", In Proceedings of the 12th International Conference on Intelligent User Interfaces (IUI '07), Honolulu, HI, US, Jan. 28-31, 2007, pp. 357-360.
Office Action dated Feb. 8, 2017 in U.S. Appl. No. 15/056,627, pp. 1-40.
Office Action dated Feb. 23, 2012 in U.S. Appl. No. 12/565,394, pp. 1-13.
Office Action dated Mar. 5, 2013 in U.S. Appl. No. 12/565,394, pp. 1-25.
Office Action dated Mar. 7, 2014 in U.S. Appl. No. 13/166,723, pp. 1-18.
Office Action dated Mar. 19, 2015 in U.S. Appl. No. 14/272,099, pp. 1-17.
Office Action dated Mar. 21, 2012 in U.S. Appl. No. 12/628,587, pp. 1-39.
Office Action dated Mar. 28, 2012 in U.S. Appl. No. 12/302,774, pp. 1-49.
Office Action dated Apr. 1, 2016 in U.S. Appl. No. 13/965,619, pp. 1-58.
Office Action dated Apr. 3, 2014 in U.S. Appl. No. 12/565,394, pp. 1-25.
Office Action dated Apr. 8, 2019 in U.S. Appl. No. 15/056,627, pp. 1-39.
Office Action dated May 4, 2017 in U.S. Appl. No. 13/166,723, pp. 1-20.
Office Action dated Jun. 5, 2015 in U.S. Appl. No. 14/642,401, pp. 1-45.
Office Action dated Jun. 22, 2015 in U.S. Appl. No. 13/965,619, pp. 1-60.
Office Action dated Jul. 7, 2014 in U.S. Appl. No. 13/965,619, pp. 1-34.
Office Action dated Jul. 10, 2015 in U.S. Appl. No. 14/339,245, pp. 1-24.
Office Action dated Jul. 17, 2013 in U.S. Appl. No. 13/166,723, pp. 1-43.
Office Action dated Jul. 30, 2018 in U.S. Appl. No. 15/056,627, pp. 1-72.
Office Action dated Aug. 1, 2016 in U.S. Appl. No. 13/166,723, pp. 1-29.
Office Action dated Aug. 16, 2012 in U.S. Appl. No. 12/565,394, pp. 1-45.
Office Action dated Oct. 11, 2013 in U.S. Appl. No. 12/565,394, pp. 1-19.
Office Action dated Oct. 12, 2017 in U.S. Appl. No. 15/056,627, pp. 1-38.
Office Action dated Oct. 16, 2012 in U.S. Appl. No. 12/982,984, pp. 1-55.
Office Action dated Oct. 28, 2016 in U.S. Appl. No. 13/965,619, pp. 1-63.
Office Action dated Nov. 7, 2013 in U.S. Appl. No. 12/302,774, pp. 1-35.
Office Action dated Nov. 15, 2012 in U.S. Appl. No. 12/302,774, pp. 1-64.

(56) References Cited

OTHER PUBLICATIONS

Office Action dated Nov. 29, 2012 in U.S. Appl. No. 12/628,587, pp. 1-64.
Office Action dated Dec. 5, 2017 in U.S. Appl. No. 13/166,723, pp. 1-18.
Office Action dated Dec. 8, 2015 in U.S. Appl. No. 13/166,723, pp. 1-16.
Office Action dated Dec. 9, 2015 in U.S. Appl. No. 13/965,619, pp. 1-43.
Office Action dated Dec. 16, 2014 in U.S. Appl. No. 13/166,723, pp. 1-22.
Oka, M., et al., "Anomaly Detection Using Layered Networks Based on Eigen Co-Occurrence Matrix", In Proc. of the Intl. Symposium on Recent Advances in Intrusion Detection (RAID'04), Sophia Antipolis, FR, Sep. 15-17, 2004, pp. 223-237.
Oka, M., et al., "Eigen Co-Occurrence Matrix Method for Masquerade Detection", In Proceedings of the 7th JSSST SIGSYS Workshop on Systems for Programming and Applications (SPA '04), Nagano, JP, Mar. 2004, pp. 1-7.
Ostinato, "Ostinato Traffic Generator for Network Engineers", last accessed Mar. 17, 2017, pp. 1-5, available at: http://ostinato.org/.
Oudot, L., "Wireless Honeypot Countermeasures", Technical Report, Security Focus, Feb. 13, 2004, pp. 1-23, available at: http://www.securityfocus.com/print/infocus/1761.
Pappas, V., et al., "Crimeware Swindling Without Virtual Machines", In Proceedings of the 13th International Conference on Information Security (ISC '10), Boca Raton, FL, US, Oct. 25-28, 2010, pp. 196-202.
Pappas, V., et al., "Evaluation of Spyware Detection System Using Thin Client Computing", In Proceedings of the 13th International Conference on Information Security and Cryptology (ICISC '10), Seoul, KR, Dec. 1-3, 2010, pp. 222-232.
Pereira, J., "How Credit-Card Data Went out Wireless Door", Wall Street Journal, May 4, 2007, pp. 1-4, available at: http://online.wsj.com/article/SB117824446226991797.html.
Petroni, Jr., N.L., et al., "Copilot—A Coprocessor-Based Kernel Runtime Integrity Monitor", In Proceedings of the 13th USENIX Security Symposium, San Diego, CA, US, Aug. 9-13, 2004, pp. 179-194.
Phyo, A.H. and Furnell, S.M., "A Detection-Oriented Classification of Insider IT Misuse", In Proceedings of the 3rd USENIX Security Conference, Las Vegas, NV, US, Apr. 14-15, 2004, pp. 1-12.
Plummer, D.W. and Greenwood, W.H., "The History of Nuclear Weapon Safety Devices", In Proceedings of the 34th AIAA/ASME/SAE/ASEE Joint Propulsion Conference, Cleveland, OH, US, Jul. 13-15, 1998, pp. 1-10.
Prevelakis, V. and Spinellis, D., "The Athens Affair", In IEEE Spectrum, vol. 44, No. 7, Jul. 2007, pp. 26-33.
Provos, N., "A Virtual Honeypot Framework", In Proceedings of the 13th USENIX Security Symposium, San Diego, CA, US, Aug. 9-13, 2004, pp. 1-14.
Provos, N., "Defeating Statistical Steganalysis", Dec. 2001, pp. 1-113, available at: http://niels.xtdnet.nl/stego/.
Randazzo, M.R., et al., "Insider Threat Study: Illicit Cyber Activity in the Banking and Finance Sector", Technical Report, Carnegie Mellon University, Jun. 2005, pp. 1-28.
Reynolds, D., "Gaussian Mixture Models", In Encyclopedia of Biometrics, Springer, 2009 (month unknown), pp. 659-663, available at: http://dx.doi.org/10.1007/978-0-387-73003-5_196.
Richardson, R., "CSI Computer Crime & Security Survey", Computer Security Institute, 2008, pp. 1-30, available at: http://gocsi.com/SurveyArchive.
Rivest, R.L., "Chaffing and Winnowing: Confidentiality without Encryption", In CryptoBytes, Mar. 18, 1998, pp. 12-17.
Sailer, R., et al., "Design and Implementation of a TCG-based Integrity Measurement Architecture", In Proceedings of the 13th USENIX Security Symposium, San Diego, CA, US, Aug. 9-13, 2004, pp. 223-238.
Salem, M.B. and Stolfo, S.J., "Masquerade Attack Detection Using a Search-Behavior Modeling Approach", Technical Report CUCS-027-09, Columbia University, 2009, pp. 1-17.
Salem, M.B. and Stolfo, S.J., "Masquerade Detection Using a Taxonomy-Based Multinomial Modeling Approach in UNIX Systems", Technical Report CUCS-021-08, Columbia University, 2008, pp. 1-14.
Salem, M.B., et al., "A Survey of Insider Attack Detection Research", In Insider Attack and Cyber Security: Beyond the Hacker, Springer, Apr. 2008, pp. 69-90.
Salem, M.B., et al., "Modeling User Search-Behavior for Masquerade Detection", In Proceedings of the 14th International Symposium on Recent Advances in Intrusion Detection, Menlo Park, CA, US, Sep. 20-21, 2011, pp. 181-200.
Saroiu, S., et al., "Measurement and Analysis of Spyware in a University Environment", In Proceedings of the 1st Symposium on Networked Systems Design and Implementation (NSDI '04), San Francisco, CA, US, Mar. 29-31, 2004, pp. 141-153.
Scholkopf, B., et al., "Estimating the Support of a High-Dimensional Distribution", Technical Report MSR-TR-99-87, Microsoft Research, Sep. 18, 2000, pp. 1-31.
Schonlau, M., "Masquerading User Data", last accessed Jun. 13, 2012, pp. 1-2, available at: http://www.schonlau.net/intrusion.html.
Schonlau, M., et al., "Computer Intrusion: Detecting Masquerades", In Statistical Science, vol. 16, No. 1, Feb. 2001, pp. 58-74.
Schultz, E.E., "A Framework for Understanding and Predicting Insider Attacks", In Journal of Computers and Security, vol. 21, No. 1, Oct. 1, 2002, pp. 526-531.
Schultz, M.G., et al., "Data Mining Methods for Detection of New Malicious Executables", In Proceedings of the IEEE Symposium on Security and Privacy (S&P '01), Oakland, CA, US, May 14-16, 2001, pp. 38-49.
Sekar, R., et al., "A Fast Automaton-Based Method for Detecting Anomalous Program Behaviors", In Proceedings of the IEEE Symposium on Security & Privacy (S&P '01), Oakland, CA, US, May 14-16, 2001, pp. 144-155.
Seo, J. and Cha, S., "Masquerade Detection Based on SVM and Sequence-Based User Commands Profile", In Proc, of the 2nd ACM Symposium on Information, Computer and Comms. Security (ASIACCS '07), SG, Mar. 20-22, 2007, pp. 398-400.
Shavlik, J. and Shavlik, M., "Selection, Combination, and Evaluation of Effective Software Sensors for Detecting Abnormal Computer Usage", In Proc. of the 10th ACM SIGKDD Intl. Conf. on Knowledge Discovery and Data Mining (KDD '04), Seattle, WA, US, Aug. 22-25, 2004, pp. 276-285.
Skaion Corporation, "Skaion Corporation Home Page", last accessed Mar. 17, 2017, pp. 1-6, available at: http://www.skaion.com/.
Smith, S., "Magic Boxes and Boots: Security in Hardware", In IEEE Computer, vol. 37, No. 10, Oct. 2004, pp. 106-109.
Sommers, J. and Barford, P., "Self-Configuring Network Traffic Generation", In Proceedings of the 4th ACM SIGCOMM Conference on Internet Measurement (IMC '04), Taormina, Sicily, IT, Oct. 25-27, 2004, pp. 68-81.
Song, Y., et al., "On the Infeasibility of Modeling Polymorphic Shellcode", In Proceedings of the 14th ACM Conference on Computer and Communications Security (CCS '07), Alexandria, VA, US, Oct. 29-Nov. 2, 2007, pp. 541-551.
Spitzner, L., "Honeypots: Catching the Insider Threat", In IEEE Proceedings of the 19th Annual Computer Security Applications Conference (ACSAC), Las Vegas, NV, US, Dec. 8-12, 2003, pp. 170-179.
Spitzner, L., "Honeytokens: The Other Honeypot", Technical Report, Security Focus, Jul. 17, 2003, pp. 1-5, available at: http://www.symantec.com/connect/articles/honeytokens-other-honeypot.
Spray, S. and Cooper, A., "The Unique Signal Concept for Detonation Safety in Nuclear Devices", Technical Report UC-706, Sandia National Laboratories, Dec. 1992, pp. 1-73.
Srivastava, A. and Giffin, J., "Tamper-Resistant, Application-Aware Blocking of Malicious Network Connections", In Proc. of the 11th Intl. Symposium on Recent Advances in Intrusion Detection (RAID '08), Cambridge, MA, US, Sep. 15-17, 2008, pp. 39-58.

(56) References Cited

OTHER PUBLICATIONS

Stahlberg, M., "The Trojan Money Spinner", Technical Report, F-Secure Corporation, Sep. 2007, pp. 1-7, available at: http://www.f-secure.com/weblog/archives/VB2007_TheTrojanMoneySpinner.pdf.

Sticha, P.J. and Axelrad, E.T., "Using Dynamic Models to Support Inferences of Insider Threat Risk", In Computational and Mathematical Organization Theory, vol. 22, No. 3, Sep. 2016, pp. 350-381.

Stolfo, S.J., et al., "A Comparative Evaluation of Two Algorithms for Windows Registry Anomaly Detection", In Journal of Computer Security, vol. 13, No. 4, Jul. 2005, pp. 659-693.

Stolfo, S.J., et al., "Anomaly Detection in Computer Security and an Application to File System Accesses", In Proc. of the 15th Intl. Symposium on Methodologies for Intelligent Systems (ISMIS '05), Saratoga Springs, NY, US, May 25-28, 2005, pp. 14-28.

Stolfo, S.J., et al., "Fileprint Analysis for Malware Detection", Technical Report, Columbia University, Jun. 2005, pp. 1-12.

Stolfo, S.J., et al., "Insider Attack and Cyber Security: Beyond the Hacker", Springer, Apr. 7, 2008, pp. 1-228.

Stolfo, S.J., et al., "Towards Stealthy Malware Detection", In Malware Detection, Advances in Information Security, vol. 27, Oct. 2006, pp. 231-249.

Stoll, C., "Stalking the Wily Hacker", In Communications of the ACM, vol. 31, No. 5, May 1988, pp. 484-497.

Suleiman, H. and Svetinovic, D., "Evaluating the Effectiveness of the Security Quality Requirements Engineering (SQUARE) Method: A Case Study using Smart Grid Advanced Metering Infrastructure", In Requirements Engr., vol. 18, No. 3, Sep. 2013, pp. 251-279.

Symantec, "Global Internet Security Threat Report: Trends for Jul.-Dec. 2007", Apr. 2008, pp. 1-97.

Szor, P. and Ferrie, P., "Hunting for Metamorphic", Technical Report, Symantec Corporation, Jun. 2003, pp. 1-23.

Szymanski, B.K. and Zhang, Y., "Recursive Data Mining for Masquerade Detection and Author Identification", In Proceedings of the 5th Annual IEEE SMC Information Assurance Workshop, West Point, NY, US, Jun. 10-11, 2004, pp. 424-431.

Tan, K.M.C. and Maxion, R.A., "'Why 6?' Defining the Operational Limits of Stide, and Anomaly-Based Intrusion Detector", In Proceedings of the IEEE Symposium on Security and Privacy (S&P '02), Berkeley, CA, US, May 12-15, 2002, pp. 188-201.

Teng, H.S., et al., "Adaptive Real-Time Anomaly Detection Using Inductively Generated Sequential Patterns", In Proceedings of the IEEE Symposium on Security and Privacy (S&P '90), Oakland, CA, US, May 7-9, 1990, pp. 278-284.

The Honeynet Project, "Know Your Enemy: Sebek, A Kernel Based Data Capture Tool", Technical Report, Nov. 17, 2003, pp. 1-21, available at: http://old.honeynet.org/papers/sebek.pdf.

Trusteer, "Measuring the In-the-Wild Effectiveness of Antivirus Against Zeus", Technical Report, Sep. 14, 2009, pp. 1-6, available at: www.trusteer.com/files/Zeus_and_Antivirus.pdf.

Tsow, A., et al., "Warkitting: The Drive-by Subversion of Wireless Home Routers", In Journal of Digital Forensic Practice, vol. 1, No. 3, Sep. 2006, pp. 179-192.

Turing, A.M., "Computing Machinery and Intelligence", In Mind, New Series, vol. 49, No. 236, Oct. 1950, pp. 433-460.

Tygar, J.D. and Yee, B., "Dyad: A System for Using Physically Secure Coprocessors", Technical Report, CMU-CS-91-140R, Carnegie Mellon University, May 1991, pp. 1-36.

Vahdat, A., et al., "Scalability and Accuracy in a Large-Scale Network Emulator", In Proceedings of the 5th Symposium on Operating Systems Design and Implementation (OSDI '02), Boston, MA, US, Dec. 9, 2002, pp. 261-284.

Vargiya, R. and Chan, P., "Boundary Detection in Tokenizing Network Application Payload for Anomaly Detection", In Proceedings of the ICDM Workshop on Data Mining for Computer Security (DMSEC '03), Melbourne, FL, US, Nov. 19, 2003, pp. 1-15.

Vasudevan, A. and Yerraballi, R., "Cobra: Fine-Grained Malware Analysis using Stealth Localized-Executions", In Proceedings of the IEEE Symposium on Security & Privacy (S&P '06), Berkeley, CA, US, May 21-24, 2006, pp. 264-279.

Vishwanath, K.V. and Vahdat, A., "Realistic and Responsive Network Traffic Generation", In Proc. of the ACM Conf. on Applications, Technologies, Architectures, and Protocols for Computer Comms. (SIGCOMM '06), Pisa, IT, Sep. 11-15, 2006, pp. 111-122.

Walsh, T.J. and Kuhn, R., "Challenges in Securing Voice over IP", In IEEE Security & Privacy Magazine, vol. 3, No. 3, May 2005, pp. 44-49.

Wang, K., et al., "Anomalous Payload-Based Network Intrusion Detection", In Proceedings of the 7th International Symposium on Recent Advances in Intrusion Detection (RAID '04), Sophia Antipolis, FR, Sep. 15-17, 2004, pp. 203-222.

Wang, K., et al., "Anomalous Payload-Based Worm Detection and Signature Generation", In Proceedings of the 8th International Symposium on Recent Advances in Intrusion Detection (RAID '05), Seattle, WA, US, Sep. 7-9, 2005, pp. 227-246.

Wang, K., et al., "One-Class Training for Masquerade Detection", In Proceedings of the Workshop on Data Mining for Computer Security (DMSEC '03), Melbourne, FL, US, Nov. 19-22, 2003, pp. 1-10.

Watson, D., et al., "Know Your Enemy: Phishing", May 16, 2005, pp. 1-87, available at: https://web.archive.org/web/20120516142157/http://www.honeynet.org/book/export/html/86.

Willems, C., et al., "Toward Automated Dynamic Malware Analysis Using CWSandbox", In IEEE Security & Privacy, vol. 5, No. 2, Mar. 2007, pp. 32-39.

Wright, C.V., et al., "Generating Client Workloads and High-Fidelity Network Traffic for Controllable, Repeatable Experiments in Computer Security", In Proceedings of the Recent Advances in Intrusion Detection (RAID), Ottowa, ON, Canada, Sep. 15-17, 2010, pp. 218-237.

Ye, N., et al., "Probabilistic Techniques for Intrusion Detection Based on Computer Audit Data", In IEEE Transactions on Systems, Man and Cybernetics, Part A: Systems and Humans, vol. 31, No. 4, Jul. 2001, pp. 266-274.

Yeung, D.Y. and Ding, Y., "Host-Based Intrusion Detection using Dynamic and Static Behavioral Models", In Pattern Recognition, vol. 36, No. 1, Nov. 22, 2001, pp. 229-243.

Yin, H., et al., "Panorama: Capturing System-Wide Information Flow for Malware Detection and Analysis", In Proc. of the 14th ACM Conf. on Computer and Comms. Security (CCS '07), Alexandria, VA, US, Oct. 29-Nov. 2, 2007, pp. 116-127.

Yung, K.H., "Using Self-Consistent Naive-Bayes to Detect Masqueraders", In Proceedings of the Advances in Knowledge Discovery and Data Mining, 8th Pacific-Asia Conference (PAKDD '04), Sydney, AU, May 26-28, 2004, pp. 329-340.

\* cited by examiner

| THREAT TYPE | BEHAVIOR | INDICATOR | DETECTOR |
|---|---|---|---|
| INDIVIDUALS WITH ABNORMAL WORK HABITS | USES A WORK-OWNED MACHINE OUTSIDE OF NORMAL WORK HOURS (I.E., 12AM-7AM EST) AT WORK, AT HOME, OR AT REMOTE SITES | HAS ANTI-VIRUS UPDATES BETWEEN 12AM-7AM EST | AT LEAST 1 ANTI-VIRUS LOG ENTRY FOR DEFINITION UPDATES BETWEEN 12AM AND 7AM EST |
| | | IN THE TOP 5% OF THE FREQUENCY DISTRIBUTION OF VPN ACTIVITY BETWEEN 12AM-7AM EST | AT LEAST 28 VPN LOG RECORDS SHOWING A CONNECTION STARTED BETWEEN 12AM-7AM EST |
| | | IN THE TOP 5% OF THE FREQ. DISTRIBUTION OF WORKSTATION LOGINS BETWEEN 12AM-7AM EST | AT LEAST 128 ADDC LOG ENTRIES WITH TIMESTAMPS BETWEEN 12AM AND 7AM EST |
| | | IN THE TOP 5% OF THE FREQ. DISTRIBUTION OF EMAIL ACTIVITY BETWEEN 12AM-7AM EST | AT LEAST 24 EMAIL LOG RECORDS FOR OUTBOUND EMAILS SENT BETWEEN 12AM AND 7AM EST |
| | | IN THE TOP 5% OF THE FREQ. DISTRIBUTION OF WEBSITE ACTIVITY BETWEEN 12AM-7AM EST | AT LEAST 24,500 PROXY LOG ENTRIES WITH A TIMESTAMP BETWEEN 12AM AND 7AM EST |
| INDIVIDUALS WITH ABNORMALLY LARGE DATA TRANSFERS THAT ARE NOT EASILY EXPLAINED | USES A WORK-OWNED MACHINE FOR ABNORMALLY LARGE INBOUND OR OUTBOUND DATA TRANSFERS | IN THE TOP 5% OF THE FREQ. DIST. OF ATTEMPTED ACCESS TO PROHIBITED FILE SHARING SITES | AT LEAST 2000 PROXY LOG ENTRIES OF ATTEMPT ACCESS TO PROHIBITED FILE SHARING WEBSITES |
| | | IN THE TOP 5% OF THE FREQ. DIST. OF LARGE EMAILS SENT | AT LEAST 3 EMAILS WITH ATTACHMENTS LARGER THAN 5MB |
| | | IN THE TOP 5% OF THE FREQ. DIST. OF VPN SESSIONS THAT TRANSFER LARGE AMTS OF DATA | AT LEAST 7 VPN SESSIONS WHERE AT LEAST 210 MB ARE TRANSFERRED |
| | | IN THE TOP 5% OF THE FREQ. DIST. OF FIREWALL LOG ENTRIES THAT TRANSFER LARGE AMTS DATA | AT LEAST 3 FIREWALL LOG ENTRIES WHERE AT LEAST 200 KB IS TRANSFERRED |
| | | IN THE TOP 5% OF THE FREQ. DIST. OF WEB BROWSE SESSIONS TRANSFER LARGE AMTS DATA | AT LEAST 1 PROXY LOG ENTRY WHERE AT LEAST 51 MB IS TRANSFERRED |
| | | IN THE TOP 5% OF THE FREQ. DIST. OF USB ATTACHMENTS | AT LEAST 11 APPLICATION WHITE LISTING LOG ENTRIES OF DEVICES ATTACHED OR MOUNTED |
| INDIVIDUALS THAT HAVE UNUSUAL CONTENT WITH FOREIGN ENTITIES | DIGITALLY COMMUNICATES WITH NON-US ENTITIES THROUGH A WORK-OWNED MACHINE | IN THE TOP 5% OF THE FREQ. DIST. OF OUTBOUND EMAILS TO NON-US EMAIL ADDRESSES | AT LEAST 1 OUTBOUND EMAIL TO A NON-US EMAIL ADDRESS |
| | | HAVE VPN SESSIONS FROM NON-US LOCATIONS | AT LEAST 1 VPN SESS. FROM A NON-US LOCATION |
| | | IN THE TOP 5% OF THE FREQ. DIST. OF FIREWALL LOG ENTRIES TO NON-US LOCATIONS | AT LEAST 37 FIREWALL LOG ENTRIES TO NON-US LOCATIONS |
| | | IN THE TOP 5% OF THE FREQ. DIST. OF WEB BROWSING SESSIONS TO NON-US WEBSITES | AT LEAST 7100 PROXY LOG ENTRIES TO NON-US OWNED WEBSITES |

FIG. 8

METHODS, SYSTEMS, AND MEDIA FOR TESTING INSIDER THREAT DETECTION SYSTEMS

STATEMENT REGARDING FEDERALLY SPONSORED RESEARCH OR DEVELOPMENT

This invention was made with government support under 2016-16031400008 awarded by the Intelligence Advanced Research Projects Activity. The government has certain rights in the invention.

TECHNICAL FIELD

The disclosed subject matter relates to methods, systems, and media for testing insider threat detection systems. More particularly, the disclosed subject matter relates to generating and/or injecting simulated user bots into a computing environment to perform security and/or verification tasks.

BACKGROUND

Computer viruses, worms, trojans, hackers, rootkits, spyware, key recovery attacks, denial-of-service attacks, malicious software (or malware), probes, etc. are a constant menace to all users of computers connected to public computer networks (such as the Internet) and/or private networks (such as corporate computer networks). Because of these threats, many computers are protected by antivirus software and firewalls. However, these preventative measures are not always adequate. For example, documents can be embedded with malware (e.g., network sniffers, keystroke loggers, etc.) and inserted into a network or a system through a universal serial bus (USB) drive, a compact disk (CD), or downloaded from a reputable source, thereby bypassing preventative measures like firewalls and packet filters.

In addition, the removal of malware is not always possible. In many situations, malicious code can sometimes be identified, but because the infected system performs a mission-critical operation, the infection is allowed to continue since the system cannot be stopped due to the operational need to keep the system running or the requirement to keep the data intact. This has made filtering-based prevention mechanisms an ineffective and an insufficient defense. In failing to stop the malware, malware can reach systems in a network and cause serious damage, particularly if the malware is left undetected for long periods of time.

Using malware or other threats, attackers can snoop or eavesdrop on a computer or a network, download and exfiltrate data, steal assets and information, destroy critical assets and information, and/or modify information. Moreover, it should also be noted that these filtering-based prevention mechanisms are equally ineffective against inside attackers (e.g., human agents or their system, software proxies, etc.). Similar to attackers that gain access to a computer through malware, inside attackers can perform unauthorized activities, such as exfiltrate data, steal assets, destroy critical information, and/or modify information. This has become one of the most serious threats encountered in modern organizations.

With the advent of insider threat detection systems for detecting inside attackers or insider threats, there is a need in the art for approaches that test or evaluate such detection systems.

Accordingly, it is desirable to provide methods, systems, and media for testing insider threat detection systems. For example, insider threat detection systems and other detection systems can be tested with the deployment of simulated user bots that can emulate the actions of actual users. In another example, these simulated user bots can be used in a computing environment to perform one or more security and/or verification tasks.

SUMMARY

Methods, systems, and media for testing insider threat detection systems are provided.

In some embodiments of the disclosed subject matter, a method for testing insider threat detection systems is provided, the method comprising: receiving, using a hardware processor, a first plurality of actions in a computing environment that are associated with one of a plurality of user accounts; generating a plurality of models of user behavior based at least in part on the first plurality of actions, wherein each of the plurality of models of user behavior is associated with each of the plurality of user accounts; selecting a model of user behavior from the plurality of models of user behavior, wherein the model of user behavior is associated with a malicious user type; generating a simulated user bot based on the selected model of user behavior; executing the simulated user bot in the computing environment, wherein the simulated user bot injects a second plurality of actions in the computing environment; determining whether an insider threat detection system executing within the computing environment identifies the simulated user bot as a malicious user; and transmitting a notification indicating an efficacy of the insider threat detection system based on the determination.

In some embodiments, each of the first plurality of actions includes a user identifier associated with one of the plurality of user accounts, an event, and a timestamp for the event.

In some embodiments, each of the first plurality of actions includes a description of the event. In some embodiments, the description of the event includes at least one of search terms and page visitation information.

In some embodiments, at least one of the first plurality of actions includes a user selection of one or more particular documents in the computing environment.

In some embodiments, the method further comprises classifying each of the first plurality of user actions into a category of a plurality of categories of user actions.

In some embodiments, the method further comprises: storing the first plurality of actions in a storage device; translating the first plurality of actions in the storage device by applying a plurality of rules; and generating an action file for each of the plurality of user accounts based on the translated plurality of actions.

In some embodiments, the method further comprises modifying the action file by removing at least one of the first plurality of actions.

In some embodiments, the method further comprises: deriving user parameters based on the translated plurality of actions; and generating an action file based on the derived user parameters.

In some embodiments, the user parameters are derived from a subset of actions that are randomly selected from the translated plurality of actions.

In some embodiments, the method further comprises: creating a user account in the computing environment; and introducing the simulated user bot into the computing environment using the created user account.

In some embodiments, the method further comprises analyzing the second plurality of actions by determining whether the insider threat detection system identifies the simulated user bot as the malicious user.

In some embodiments, the insider threat detection system is implementing an anomaly detection model that includes one of: a Gaussian model, a support vector machine model, and a Bayesian network model.

In some embodiments, the method further comprises: modifying the simulated user bot; and determining an efficacy score of the insider threat detection system based on detections of the simulated user bot and the modified simulated user bot.

In some embodiments, the first plurality of actions in the computing environment are associated with an administrative user account and the simulated user bot emulates the user behavior of the administrative user account by inserting a plurality of decoy documents into the computing environment.

In some embodiments, the first plurality of actions in the computing environment are associated with an administrative user account and the simulated user bot emulates the user behavior of the administrative user account by automatically updating a security appliance within the computing environment and determining whether the updated security appliance generates expected state information.

In some embodiments of the disclosed subject matter, a system for testing insider threat detection systems is provided, the system comprising a hardware processor that is configured to: receive a first plurality of actions in a computing environment that are associated with one of a plurality of user accounts; generate a plurality of models of user behavior based at least in part on the first plurality of actions, wherein each of the plurality of models of user behavior is associated with each of the plurality of user accounts; select a model of user behavior from the plurality of models of user behavior, wherein the model of user behavior is associated with a malicious user type; generate a simulated user bot based on the selected model of user behavior; executing the simulated user bot in the computing environment, wherein the simulated user bot injects a second plurality of actions in the computing environment; determine whether an insider threat detection system executing within the computing environment identifies the simulated user bot as a malicious user; and transmit a notification indicating an efficacy of the insider threat detection system based on the determination.

In accordance with some embodiments of the disclosed subject matter, non-transitory computer-readable media containing computer executable instructions that, when executed by a processor, cause the processor to perform a method for testing insider threat detection systems is provided. In some embodiments, the method comprises: receiving a first plurality of actions in a computing environment that are associated with one of a plurality of user accounts; generating a plurality of models of user behavior based at least in part on the first plurality of actions, wherein each of the plurality of models of user behavior is associated with each of the plurality of user accounts; selecting a model of user behavior from the plurality of models of user behavior, wherein the model of user behavior is associated with a malicious user type; generating a simulated user bot based on the selected model of user behavior; executing the simulated user bot in the computing environment, wherein the simulated user bot injects a second plurality of actions in the computing environment; determining whether an insider threat detection system executing within the computing environment identifies the simulated user bot as a malicious user; and transmitting a notification indicating an efficacy of the insider threat detection system based on the determination.

In some embodiments of the disclosed subject matter, a system for testing insider threat detection systems is provided, the system comprising: means for receiving a first plurality of actions in a computing environment that are associated with one of a plurality of user accounts; means for generating a plurality of models of user behavior based at least in part on the first plurality of actions, wherein each of the plurality of models of user behavior is associated with each of the plurality of user accounts; means for selecting a model of user behavior from the plurality of models of user behavior, wherein the model of user behavior is associated with a malicious user type; means for generating a simulated user bot based on the selected model of user behavior; executing the simulated user bot in the computing environment, wherein the simulated user bot injects a second plurality of actions in the computing environment; means for determining whether an insider threat detection system executing within the computing environment identifies the simulated user bot as a malicious user; and means for transmitting a notification indicating an efficacy of the insider threat detection system based on the determination.

BRIEF DESCRIPTION OF THE DRAWINGS

FIG. 8 is a diagram showing an illustrative example of a detection system that implements a Bayesian network, which can be used to model a threat type, behavior, indicators, and detectors, in accordance with some embodiments of the disclosed subject matter.

DETAILED DESCRIPTION

Figure 1:
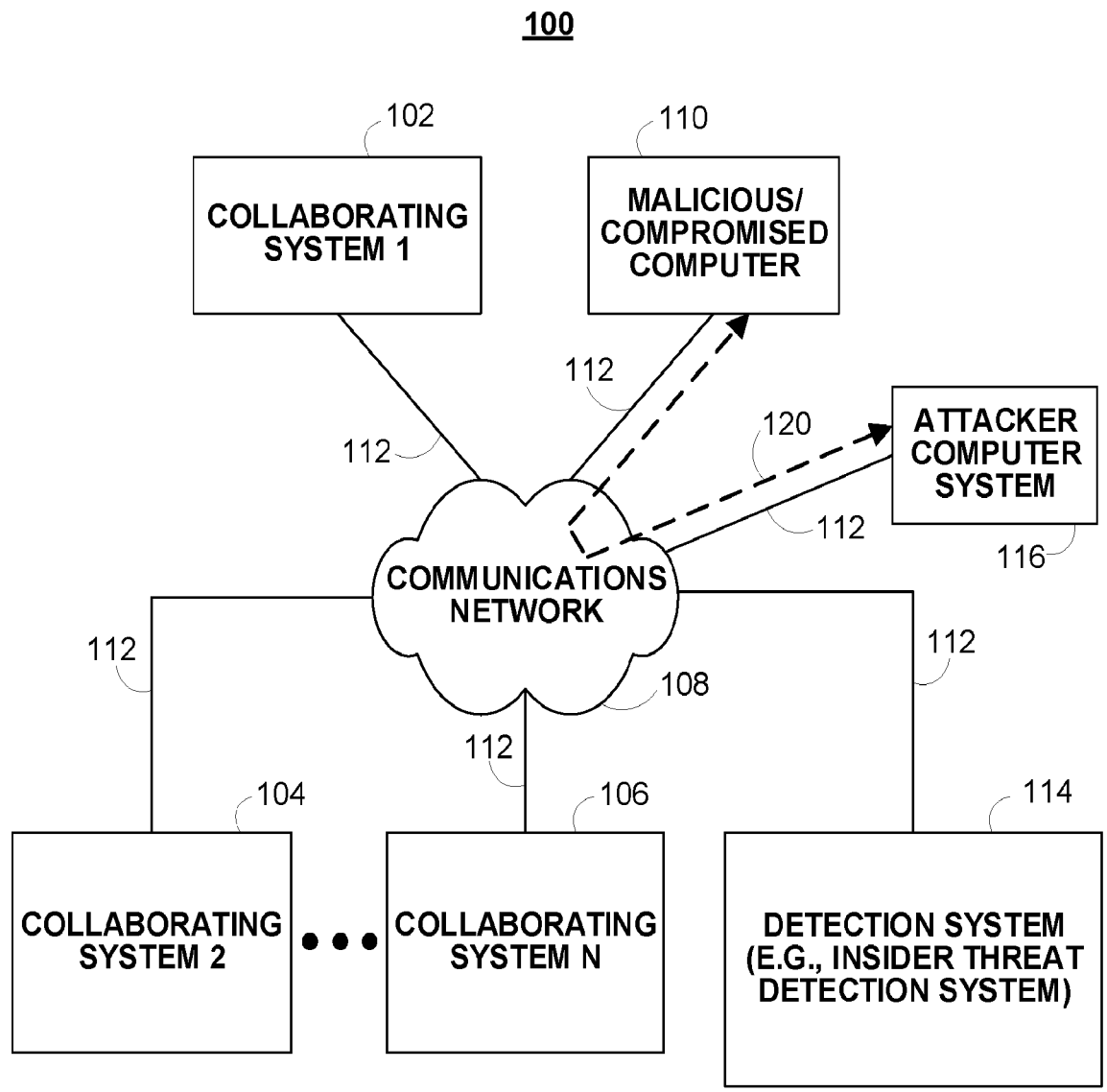
FIG. 1 is a diagram of a system suitable for implementing an application that generates and/or injects simulated user bots in accordance with some embodiments of the disclosed subject matter.

Generally speaking, the mechanisms described herein relate to generating and injecting simulated user bots into a computing environment. Simulated user bots can, for example, simulate users of different user types (e.g., a particular type of normal user, a particular type of malicious user, etc.). In a more particular example, an agent can be implemented in a computing environment that runs a host application to inject actions of simulated users of one or more different user types without interfering with the operations of the systems in the computing environment. The injected actions can include the injection of network data and/or host data at various times within the computing environment.

In some embodiments, the mechanisms can use the simulated user bots to inject actions that emulate a user of a particular user type and can determine whether an insider threat detection system or any other suitable detection system that is monitoring the computing environment detects the actions of the simulated user bot when the simulated user bot is configured to inject actions similar to those of a malicious user.

It should be noted that the insider threat detection system can implement any suitable anomaly detection model. For example, an insider threat detection system can implement a Gaussian mixture model, a support vector machine, and/or a Bayesian network and the simulated user bots can be used to evaluate one or more of the features of an insider threat detection system in the computing environment.

In some embodiment, the simulated user bot can be configured and/or modified to test whether the injected actions are detected by the insider threat detection system. For example, a simulated user bot associated with a user account in a computing environment can be changed from a normal user type to a malicious user type (e.g., by modifying simulated user activity to include user actions of a malicious user). In continuing this example, a simulated user bot can inject user actions associated with a normal user type into the computing environment for a first period of time and, for a second period of time, can be modified to inject user actions associated with a malicious user type. The simulated user bot of a testing system can then determine whether a detection system, such as the insider threat detection system, detected the injected user actions associated with the malicious user type that were injected by the modified simulated user bot.

In a more particular example, the simulated user bots described herein can be configured to generate trace data, which can be used as indicators and detectors in identifying malicious users by insider threat detection systems. These indicators can be temporal statistics derived from an analysis of monitored network logs. These statistics derive group norms from which abnormal users are identified. Controlling the pace and frequency of these trace indicators generated by a simulated user bot can be used to test the insider threat detection system at its margins. This can, for example, provide a detailed analysis of the ease of evading detection by the insider threat detection system. Moreover, errors in the deployed monitoring infrastructure, either due to bugs in configurations or noise introduced by faulty sensors, can also be revealed if a simulated user bot if undetected (e.g., although directed to purposely exhibit the indicator).

In another more particular example, the simulated user bots can be used to measure the computational cost of maintaining temporal statistics. For example, low and slow behaviors may cause an insider threat detection system to maintain long term state information for many users, which causes an increasing cost in terms of storage and computation. Accordingly, the use of simulated user bots can provide an approach for evaluating the accuracy of an insider threat detection system and its computational costs.

It should be noted that, although the embodiments described herein generally relate to testing detection systems, such as an insider threat detection system, and whether such detection systems detect the actions of a simulated user bot, this is merely illustrative.

In some embodiments, the mechanisms can use the simulated user bots to perform verification tasks within the computing environment. For example, the mechanisms can automatically change the configuration of a security appliance and can use the simulated user bots to inject actions that emulate a user of a particular user type (e.g., by monitoring, recording, modifying, and/or replaying actual user activity) into the computing environment having the newly configured security appliance. In continuing this example, the simulated user bots can test the outcome of such changes to the security appliance by, for example, determining whether the state of the computing environment matches an expected state of the computing environment based on the injected actions. In another example, the simulated user bots can determine whether the newly configured security appliance detected one or more actions injected by the simulated user bots into the computing environment.

In some embodiments, the simulated user bots can perform security tasks within a computing environment. For example, the mechanisms can use the simulated user bots to inject actions that emulate a user of a particular user type (e.g., an administrative user) into the computing environment, where the injected actions of such an administrative user can place decoy information in one or more particular locations within the computing environment. The use of simulated user bots to place decoy information can, for example, distribute detection capabilities for detecting the exfiltration of data or documents.

Turning to FIG. 1, an example of a system 100 in which a detection system is implemented and in which a testing mechanism can be implemented to generate and/or inject simulated user bots is shown. As illustrated, system 100 includes multiple collaborating computer systems 102, 104, and 106, a communication network 108, a malicious/compromised computer 110, communication links 112, a detection system 114, and an attacker computer system 116.

Collaborating systems 102, 104, and 106 can be systems owned, operated, and/or used by universities, businesses, governments, non-profit organizations, families, individuals, and/or any other suitable person and/or entity. Collaborating systems 102, 104, and 106 can include any number of user computers, servers, firewalls, routers, switches, gateways, wireless networks, wired networks, intrusion detection systems, and any other suitable devices. Collaborating systems 102, 104, and 106 can include one or more processors, such as a general-purpose computer, a special-purpose computer, a digital processing device, a server, a workstation, and/or various other suitable devices. Collaborating systems 102, 104, and 106 can run programs, such as operating systems (OS), software applications, a library of functions and/or procedures, background daemon processes, and/or various other suitable programs. In some embodiments, collaborating systems 102, 104, and 106 can support one or more virtual machines. Any number (including only one) of collaborating systems 102, 104, and 106 can be present in system 100, and collaborating systems 102, 104, and 106 can be identical or different.

It should be noted that the testing mechanisms for generating and/or injected simulated user bots (e.g., for testing detection system 114) can be implemented on one or more of collaborating systems 102, 104, and 106. For example, a collaborating system can deploy a simulated user bot into a computing environment, where the simulated user bot emulates the user actions and behaviors of a malicious user or insider attacker, and can determine whether an insider threat detection system connected to the collaborating system (e.g., over a communication network) detected the simulated user bot. In another example, a collaborating system can deploy a simulated user bot into a computing environment, where the simulated user bot emulates an administrative user by injecting decoy data and/or decoy documents at particular locations within the computer environment to lure covert malware or an insider attacker.

In a more particular example, a collaborating system implementing the testing mechanisms described herein can access a database, a corresponding translator, and action files. For example, a collaborating system implementing the testing mechanisms described herein can generate user actions by accessing a database of previously obtained user actions and user behaviors, translating the previously obtained user actions into Python action files. The information contained within the database can include, for example, a unique identifier for a user, a time stamp for a given action, an action column to describe the event that takes place, and a details field that provides additional information on a given action. The details field can contain specific information, such as the exact terms searched for in a search query interface, the title of a page visited, etc. It should be noted that simulated user bots can be generated and injected into a computing environment, such that they are generally identical to users in many facts from having to login to the speed at which a user edits a document.

In some embodiments, the testing mechanisms that use simulated user bots can be distributed among multiple collaborating systems. For example, a first collaborating system can monitor and/or provide user actions and, based on the monitored user actions, can generate one or more simulated user bots that emulate the user actions and behaviors of a particular type of user (e.g., an insider attacker), a second collaborating system can inject the simulated user bots into the computing system, and a third collaborating system can communicate and/or monitor an insider threat detection system to determine whether the insider threat detection system detected the simulated user bots. In a more particular example, one of these collaborating systems can calculate performance metrics for the insider threat detection system (e.g., how many simulated user bots were detected, at what computational cost, etc.).

It should be noted that, in some embodiments, a device implementing the testing mechanisms for generating and/or injecting simulated user bots (e.g., for testing detection systems, such as insider threat detection systems) can be separate from collaborating systems 102, 104, and 106.

Communication network 108 can be any suitable network for facilitating communication among computers, servers, etc. For example, communication network 108 can include private computer networks, public computer networks (such as the Internet), telephone communication systems, cable television systems, satellite communication systems, wireless communication systems, any other suitable networks or systems, and/or any combination of such networks and/or systems. For example, simulated user bots can inject user actions over communication network 108.

Malicious/compromised computer 110 can be any computer, server, or other suitable device that includes the covert malware. In addition, malicious/compromised computer 110 can be used to launch a computer threat, such as a virus, worm, trojan, rootkit, spyware, key recovery attack, denial-of-service attack, malware, probe, etc. The owner of malicious/compromised computer 110 can be any university, business, government, non-profit organization, family, individual, and/or any other suitable person and/or entity.

It should be noted that, in some embodiments, an external attacker can become an inside attacker when the external attacker attains internal network access. For example, using spyware, rootkits, or any other suitable malware, external attackers can gain access to communications network 108. Such software can easily be installed on computer systems from physical or digital media (e.g., email, downloads, etc.) that provides an external attacker with administrator or "root" access on a machine along with the capability of gathering sensitive data. The external attacker can also snoop or eavesdrop on one or more systems 102, 104, and 106 or communications network 108, download and exfiltrate data, steal assets and information, destroy critical assets and information, and/or modify information. Rootkits have the ability to conceal themselves and elude detection, especially when the rootkit is previously unknown, as is the case with zero-day attacks. An external attacker that manages to install rootkits internally in effect becomes an insider, thereby multiplying the ability to inflict harm.

In some embodiments, the owner of malicious/compromised computer 110 may not be aware of what operations malicious/compromised computer 110 is performing or may not be in control of malicious/compromised computer 110. Malicious/compromised computer 110 can be acting under the control of another computer (e.g., attacker computer system 116) or autonomously based upon a previous computer attack which infected computer 110 with a virus, worm, trojan, spyware, malware, probe, etc. For example, some malware can passively collect information that passes through malicious/compromised computer 110. In another example, some malware can take advantage of trusted relationships between malicious/compromised computer 110 and other systems 102, 104, and 106 to expand network access by infecting other systems. In yet another example, some malware can communicate with attacking computer system 116 through an exfiltration channel 120 to transmit confidential information (e.g., IP addresses, passwords, credit card numbers, etc.).

It should be noted that any number of malicious/compromised computers 110 and attacking computer systems 116 can be present in system 100, but only one is shown in FIG. 1 to avoid overcomplicating the drawing. It should also be noted that malicious/compromised computer 110 and/or attacking computer system 116 may have been present in system 100 at a particular point in time in which user action information, such as network data and host data, can be monitored and/or captured for use in generating simulated user bots that emulate such malicious users.

More particularly, for example, each of the one or more collaborating or client computers 102, 104, and 106, malicious/compromised computer 110, detection system 114, and attacking computer system 116, can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, client computer 1010 can be implemented as a personal computer, a personal data assistant (PDA), a portable email device, a multimedia terminal, a mobile telephone, a set-top box, a television, etc.

In some embodiments, any suitable computer readable media can be used for storing instructions for performing the processes described herein, can be used as a content distribution that stores content and a payload, etc. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 1, communication links 112 can be any suitable mechanism for connecting collaborating systems 102, 104, 106, malicious/compromised computer 110, detection system 114, and attacking computer system 116 to communication network 108. Links 112 can be any suitable wired or wireless communication link, such as a T1 or T3 connection, a cable modem connection, a digital subscriber line connection, a Wi-Fi or 802.11(a), (b), (g), or (n) connection, a dial-up connection, and/or any other suitable communication link. Alternatively, communication links 112 can be omitted from system 100 when appropriate, in which case systems 102, 104, and/or 106, computer 110, and/or detection system 114 can be connected directly to communication network 108.

Detection system 114 can be any computer, server, router, or other suitable device for modeling, generating, inserting, distributing, monitoring, verifying, and/or managing decoy information into system 100. Similar to collaborating systems 102, 104, and 106, detection system 114 can run programs, such as operating systems (OS), software applications, a library of functions and/or procedures, background daemon processes, and/or various other suitable programs. In some embodiments, detection system 114 can support one or more virtual machines.

Figure 2:
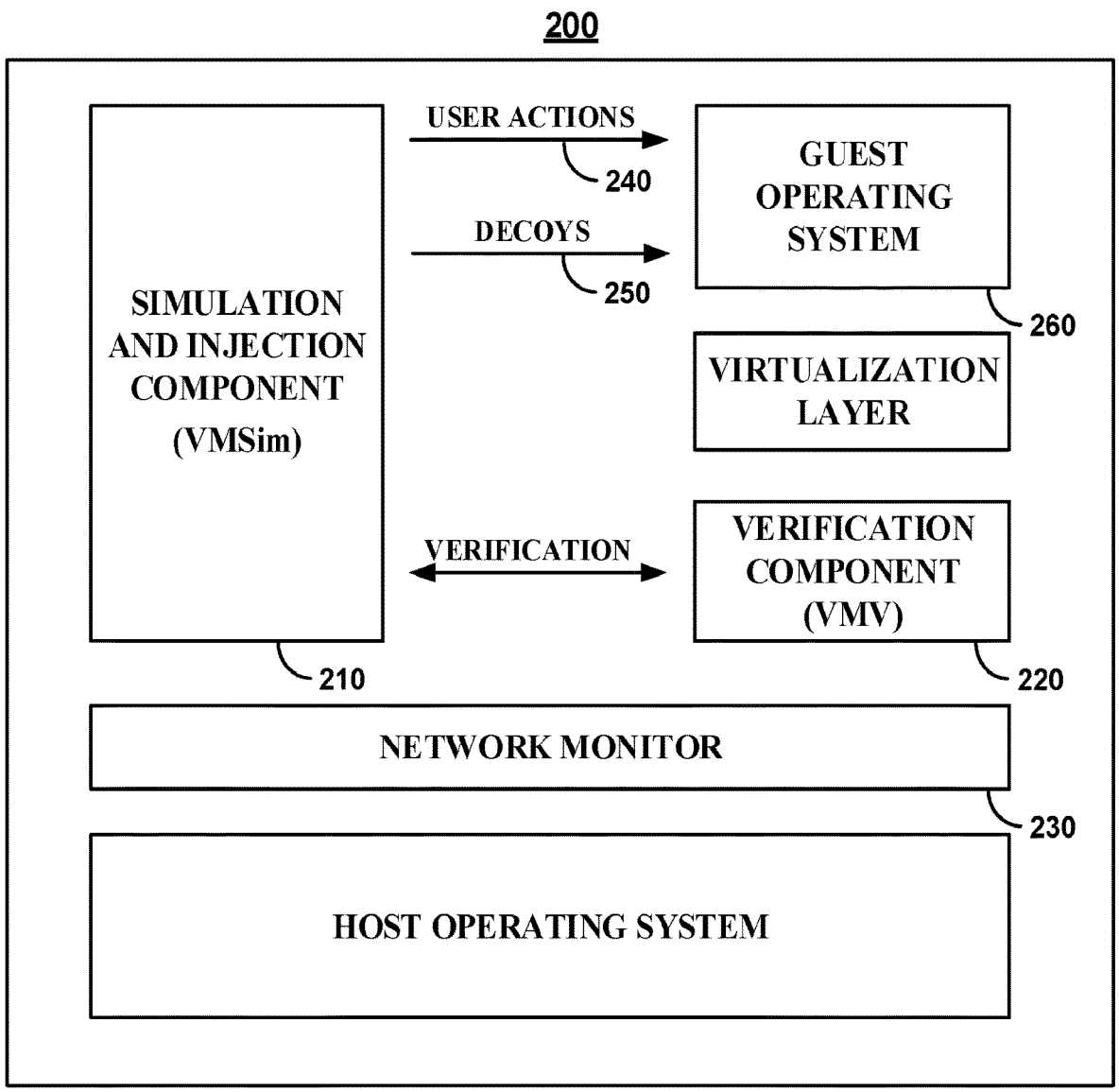
FIG. 2 is a diagram of a detection system, such as an insider threat detection system, that is external to a virtual-machine based host, where simulated user bots can be used to test the insider threat detection system, in accordance with some embodiments of the disclosed subject matter.

In a more particular example, detection system 114 can be implemented in a virtual machine environment, where an out-of-host agent drives simulated user activity that is meant to convince covert malware residing within the guest operating system that it has captured legitimate credentials. This is generally applicable to systems that are fully virtualized (e.g., VMWare) and the operating systems on which they are supported. An illustrative example of detection system 114 implemented in a virtual machine architecture is shown in FIG. 2.

As shown, architecture 200 can include a simulation and injection component 210 (sometimes referred to herein as "VMSim" or a "simulation engine"), a virtual machine verification (VMV) component 220, and a network monitoring component 230. Simulation and injection component 210 executes outside of a virtual machine and passes its actions (e.g., user actions 240 and simulated user activity or decoys 250) into a guest operating system 260. More particularly, simulation and injection component 210 generates simulated user activity 250 by recording, modifying, and replaying keyboard and mouse events captured from users. In addition, simulation and injection component 210 can replay and inject monitored user activity (without decoys) to increase the believability of the simulated user activity 250. Upon the injection of simulated user activity 250, virtual machine verification component 220 can be used to determine whether the state of the virtual machine is an expected state (e.g., one of a number of predefined states). Network monitoring component 230 can then detect when covert malware or a simulated user bot attempts to exfiltrate data. For example, network monitoring component 230 records and transmits alerts in response to determine that malicious traffic is originating from the virtual machine host. In some embodiments, verification component 220 or any other suitable component in FIG. 2 can be used to determine whether the simulated user activity 250 corresponding to a malicious user or an insider attacker was detected by an insider threat detection system.

Figure 3:
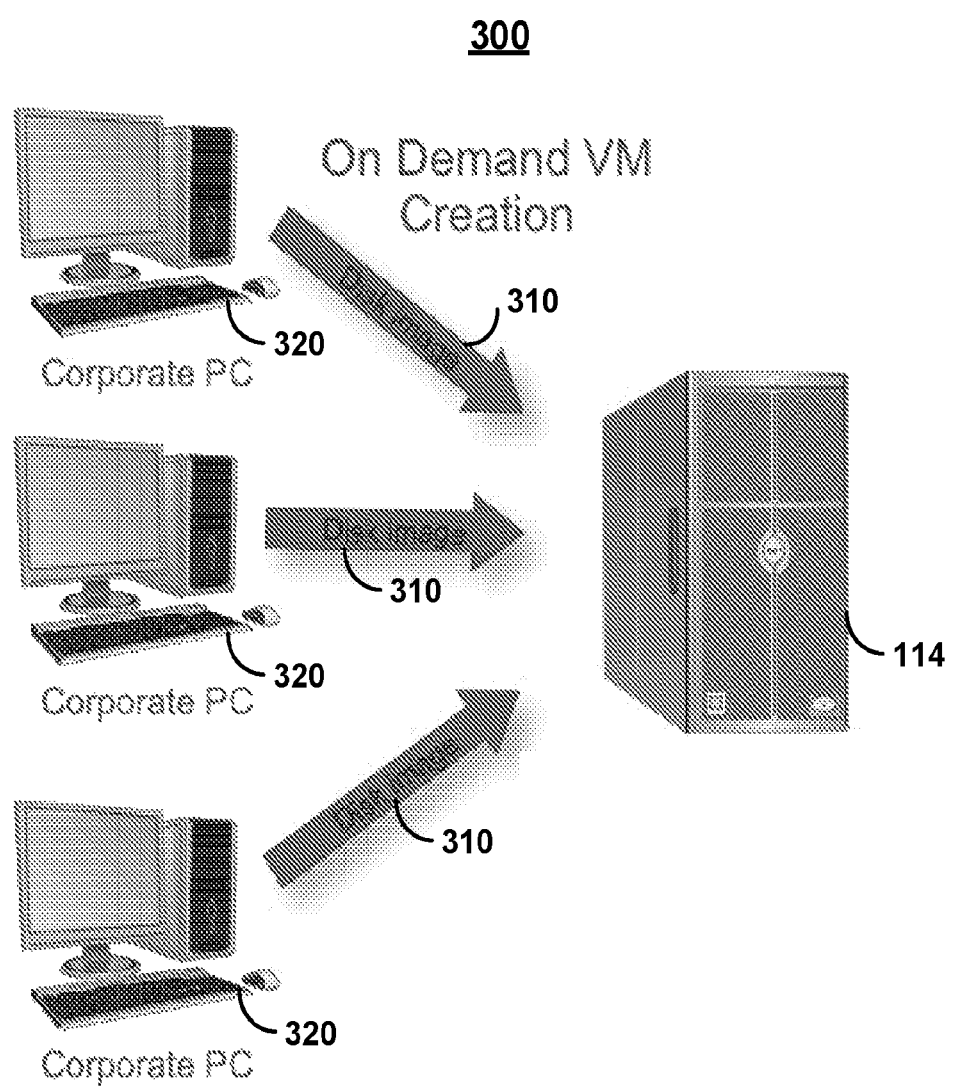
FIG. 3 is a diagram of a detection system, such as an insider threat detection system, deployed in an enterprise environment with non-virtual machine-based hosts, where simulated user bots can be used to test the insider threat detection system, in accordance with some embodiments of the disclosed subject matter.

Alternatively or additionally, detection system 114 and its detection mechanisms can be deployed in an enterprise environment. For example, detection system 114 can be used in an enterprise environment to monitor for site-specific credential misuse and to profile attackers targeting that environment. In a more particular example, detection system 114 can be deployed to run simulations on a user's system (e.g., one of collaborating systems 102, 104, or 106) when it is idle (e.g., during meetings, at particular times during the night, etc.). Virtual machines can be created on demand from a user's native environment. For example, as shown in FIG. 3, detection system 114 is deployed as an enterprise service that runs a simulation over exported copies of multiple users' disk images 310 from corresponding user computers 320. Alternatively, in some embodiments, the machine state of each user computer 320 can be synchronized with the state of the detection system 114. As a result, detection system 114 including, for example, a simulation and injection component 210 of FIG. 2, can use the disk images 310 to simulate user activity and inject the simulated user activity into the enterprise environment 300. This allows detection system 114 to detect covert malware conducting long-term corporate reconnaissance. For example, detection system 114 can be used to detect covert malware that attempts to steal credentials only after they have been repeatedly used in the past. That is, instead of generally detecting covert malware, detection system 114 can be used to detect targeted espionage software.

In some embodiments, although the embodiment described above relates to detection system 114 simulating user activity and injecting the simulated user activity to catch covert malware, user computers 320 or any other suitable computing device can generate simulated user activity and deploy a simulated user bot into the enterprise environment 300, where the simulated user bot emulates the user actions and behaviors of a malicious user or insider attacker. In continuing this example, user computers 320 or any other suitable computing device implementing the testing mechanisms described herein can then determine whether an insider threat detection system, such as detection system 114, detected the simulated user bot. In another example, a first user computer 320 can monitor and/or provide user actions and, based on the monitored user actions, can generate one or more simulated user bots that emulate the user actions and behaviors of a particular type of user (e.g., an insider attacker), a second user computer 320 can inject the simulated user bots into the enterprise environment 300, and a third user computer 320 can communicate and/or monitor detection system 114 to determine whether detection system 114 detected the simulated user bots. In a more particular example, one of the user computers 320 can calculate performance metrics for detection system 114 (e.g., how many simulated user bots were detected, how long did it take to detect a particular simulated user bot from the time it was injected into the enterprise environment, at what computational cost, etc.).

It should be noted that, in some embodiments, specialized decoy information and general decoy information can be generated, where specialized decoys are used to detect targeted espionage software and where general decoys can be used to assist the organization identify compromised internal users. In some embodiments, simulated user bots can emulate an administrative user by generating and/or placing decoy information within the computing environment to, for example, lure internal users to exfiltrate the decoy information or detect whether detection system 114 detects the exfiltration of the decoy information placed by a simulated user bot.

Figure 4:
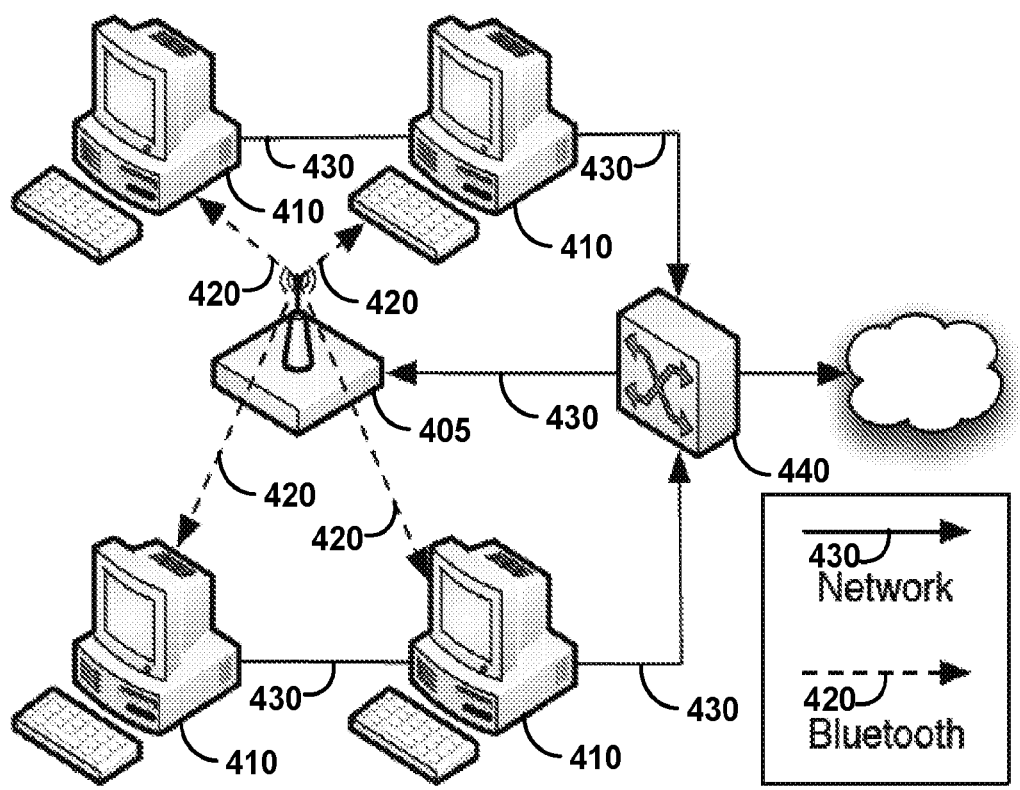
FIG. 4 is a diagram of a detection system, such as an insider threat detection system, deployed in a wireless device-based architecture, where simulated user bots can be used to test the insider threat detection system, in accordance with some embodiments of the disclosed subject matter.

In some embodiments, a testing system 405 and its testing mechanisms can be implemented without using virtual machines. For example, a wireless device-based architecture 400, as shown in FIG. 4, provides a testing device 405 that injects a simulated user bot (e.g., having mouse and keyboard events based on user activity information) wirelessly using the Bluetooth protocol or any other suitable wireless protocol into user computers 410 via wireless communication paths 420. In a more particular example, testing device 405 can run a Bluetooth proxy application that receives user activity (e.g., by monitoring network traffic), translates the user activity to Bluetooth human interface device (HID) protocol, and transmits them to a host, such as one of user computers 410. Testing device 405 can then verify the success and failure of an insider threat detection system monitoring user computers 410 using traffic analysis of encrypted protocols. For example, as shown in FIG. 4, network traffic 430 can be monitored and portions of the network traffic can be verified to determine whether an insider threat detection system, which is monitoring user computers 410, detected the simulated user bot injected into the computing environment and/or inhibited the simulated user bot from proceeding. In another example, testing device 405 can run a Bluetooth proxy application that monitors user activity of an administrative user and generates a simulated user bot that emulates the user actions of the administrative user, which, in turn, places decoy information within the computing environment to distribute monitoring capabilities for the detection of insider attackers attempting to exfiltrate data and/or documents.

Figure 5:
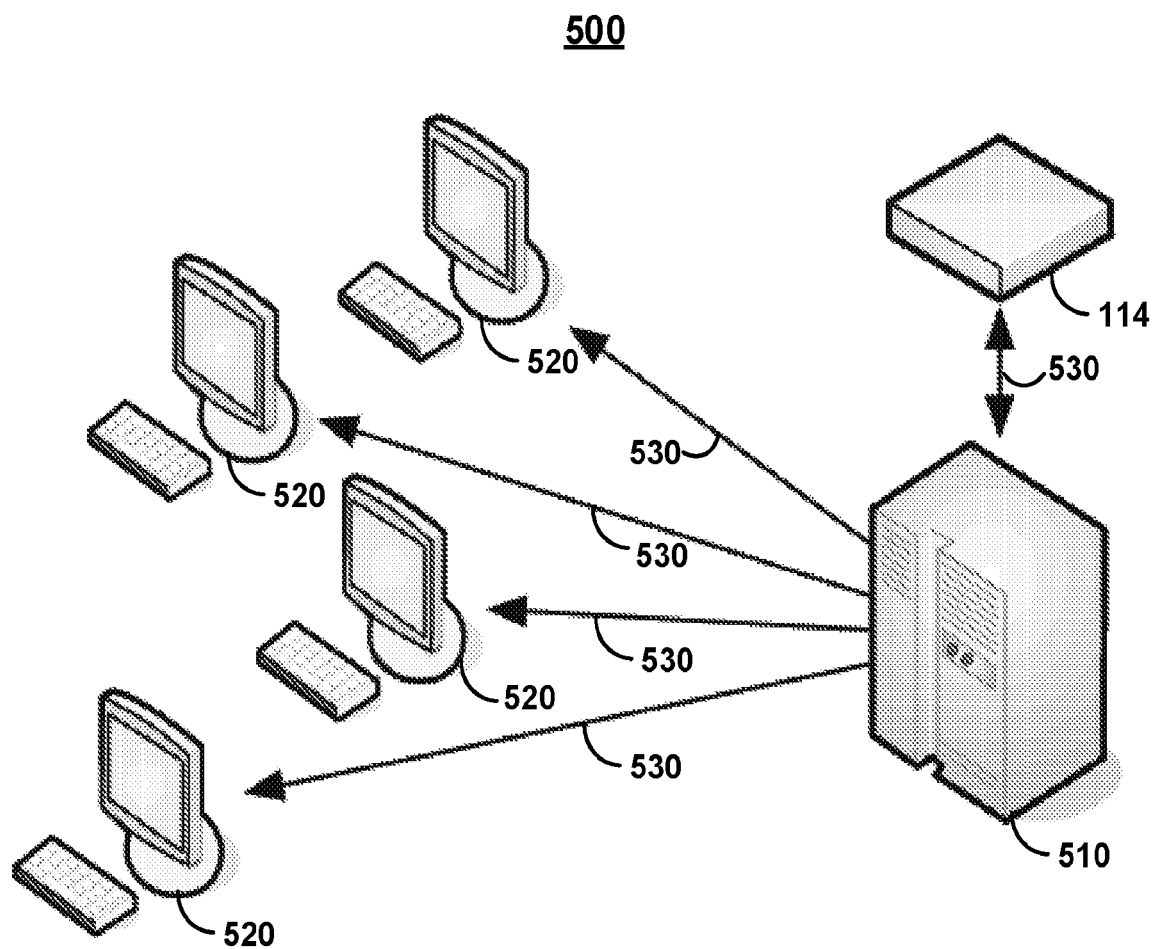
FIG. 5 is a diagram of a detection system, such as an insider threat detection system, deployed in a thin client-based architecture, where simulated user bots can be used to test the insider threat detection system, in accordance with some embodiments of the disclosed subject matter.

In yet another suitable embodiment where detection system 114 and its detection mechanisms can be implemented without using virtual machines, FIG. 5 shows a thin-client based architecture 500 having detection system 114 implemented as a thin client. As shown, thin client-based architecture generally includes a central virtual machine host 510 (which can be one physical server or multiple servers) and one or more dummy computers 520 connected to the host via communication paths 530 (e.g., a local and fast network connection). Detection system 114 and other thin clients 520, which can include a testing system, transmit user actions (e.g., keyboard events, mouse events, etc.) to central virtual machine host 510 and remotely display the screen output of the virtual machine. That is, particular computations and functionality can be offloaded to host 510. Using thin clients 520, each user can access and use virtual machines hosted on central virtual machine host 510 and detection system 114 can access each hosted virtual machine.

More particularly, detection system 114 is deployed as a thin client (outside of the virtual machines) that periodically connects to each hosted virtual machine and detects whether there is covert malware on one or more of the thin clients. In order to test detection system 114, a testing system can inject a simulated user bot within the computing environment. The remote access protocols used in thin client environments (e.g., Citrix, VNC, remote desktop protocol (RDP), etc.) can be used for both injecting simulated user activity or any other suitable decoy information and verification. For example, a testing system in the thin client environment can inject a simulated user bot that employs decoy credentials into a hosted virtual machine and can then perform a verification of the injected simulated user bot. In continuing this example, detection system 114 can receive arbitrary portions of rendered screens and count the absolute number of pixels in each of the portions and the testing system can determine whether detection system 114 detects the simulated user bot and its actions.

It should be noted that detection system 114 and/or a testing system can generate decoy information (e.g., bogus credentials) that complies with particular properties that enhance the deception for different classes or threat levels of inside attackers. Decoy information can be generated that is, for example, believable, enticing, conspicuous, detectable, variable, differentiable from actual or authentic information, non-interfering with legitimate users, etc.

Detection system 114 and/or a testing system can generate decoy information that is believable. That is, decoy information can be generated such that it is difficult for a user to discern whether the decoy information is from a legitimate source or in fact a decoy. For example, decoy information can be generated to appear realistic and indistinguishable from actual information used in the system. More particularly, detection system 114 and/or a testing system can record information, events, and network flow in systems 100, 200, 300, 400, and 500. For example, detection system 114 and/or a testing system can record user activity, such as keyboard and mouse events, modify the recorded user activity to simulate believable decoy information in the form of simulated user activity. In addition, detection system 114 and/or a testing system can replay recorded user activity captured from real users that is not used to simulate user activity, but is used to support the believability of simulated user activity. Accordingly, using actual user activity, simulated user activity, and/or a model of user activity as described herein, covert malware or any other suitable attacking computer does not detect detection system 114 and/or a testing system as the source of decoy information.

In some embodiments, detection system 114 and/or a testing system can determine whether decoy information complies with a believability property. For example, detection system 114 and/or a testing system can perform a decoy Turing test, where portions of decoy information and legitimate information are selected—one contains decoy information and the other contains information randomly selected from authentic information. The two pieces of information can be presented to a volunteer or any other suitable user and the volunteer can be tasked to determine which of the two are authentic. In some embodiments, in response to testing the believability of decoy information and receiving a particular response rate, detection system 114 and/or a testing system can consider decoy information to comply with the believability property. For example, detection system 114 and/or a testing system can determine whether a particular piece of decoy information, such as a bogus credential, is selected as an authentic and believable piece of information at least 50% of the time, which is the probability if the volunteer user selected at random. In another example, detection system 114 and/or a testing system can allow a user, such as an administrator user that has access to detection system 114 and/or a testing system, to select a particular response rate for the particular type of decoy information. If the decoy information is tested for compliance with the believability property and receives an outcome less than the predefined response rate, detection system 114 and/or a testing system can discard the decoy information and not inject the decoy information in the computing environment.

Similarly, detection system 114 and/or a testing system can also determine whether simulated user activity complies with a believability property. For example, detection system 114 and/or a testing system can perform a Turing test, where portions of simulated user activity and actual user activity are selected. The two pieces of information can be presented to a volunteer or any other suitable user and the volunteer can be tasked to determine which of the two are authentic.

Accordingly, decoy information that complies with one or more of the above-mentioned properties can be used to entice covert malware into believing that it has obtained legitimate credentials and confuse or slow down covert malware. For example, covert malware can be forced to spend time and energy obtaining information and then sorting through the collected information to determine actual information from decoy information. In another example, the decoy information can be modeled to contradict the actual or authentic data on one of systems 100, 200, 300, 400, or 500, thereby confusing the covert malware at attacking computer system 116 or the user of attacking computer system 116 and luring the user of attacking computer system 116 to risk further actions to clear the confusion.

As used herein, decoy information can be generated by the testing system or any other suitable system and placed by a simulated user bot generated by the testing system within the computing environment to detect the attempted exfiltration of data or documents from the computing environment. For example, by using one or more simulated user bots to place decoy information in multiple locations within the computing environment, the simulated user bots can be used to distribute security and monitor capabilities.

Figure 6:
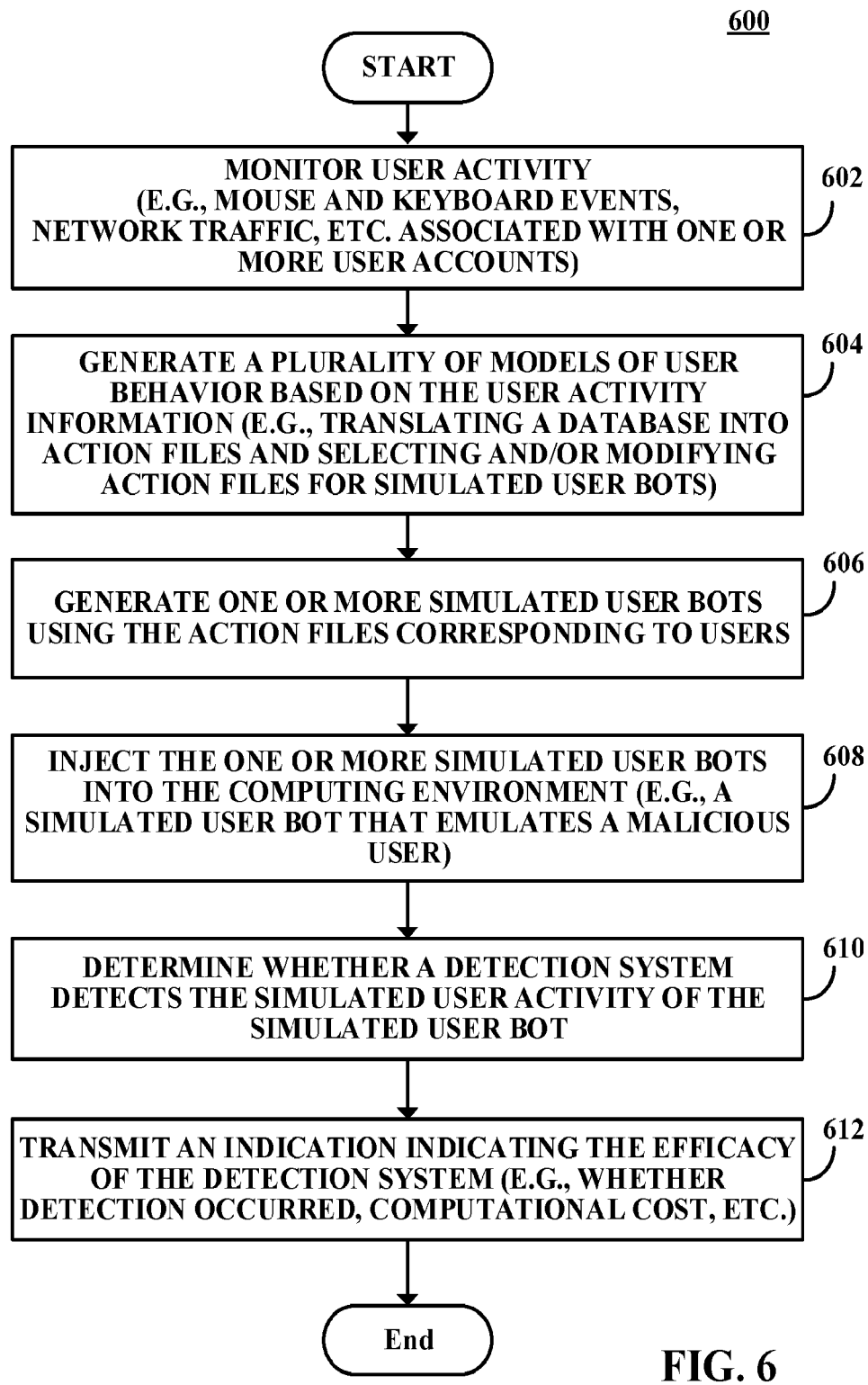
FIG. 6 is a diagram showing an illustrative example of a process for generating and/or injecting simulated user bots in accordance with some embodiments of the disclosed subject matter.

As described above, mechanisms for generating and injecting simulated user bots into a computing environment are provided. FIG. 6 illustrates an example of a process 600 for generating and injecting simulated user bots into a computing environment in accordance with some embodiment of the disclosed subject matter. As shown, process 600 begins by monitoring user activity at 602. The user activity can include, for example, mouse and keyboard events captured from users (e.g., users at collaborating system 102 of FIG. 1), network traffic, etc. For example, as shown in FIG. 2, simulation and injection component 210 can receive recorded mouse and keyboard events (e.g., X-Window events) captured from users. In another example, as shown in FIG. 4, a testing system can monitor traffic and conversation summaries to determine user activity over a network.

In yet another example, as shown in FIG. 5, a testing system can receive monitored mouse and keyboard actions from users on user computers 520.

In a more particular example, process 600 can obtain user actions by accessing a database of previously obtained user actions and user behaviors. The information contained within the database can include, for example, a unique identifier for a user, a time stamp for a given action, an action column to describe the event that takes place, and a details field that provides additional information on a given action. The details field can contain specific information, such as the exact terms searched for in a search query interface, the title of a page visited, etc.

In some embodiments, simulated user activity can then be generated based on the monitored user activity at 604. For example, as shown in FIG. 2, simulation and injection component (VMSim) 210 can perform a simulation process that records, modifies, and replays mouse and keyboard events based on the monitored user activity.

In continuing this example, process 600 can use a simulated user bot database translator that converts the fields in the database into an action file. For example, the simulated user bot database translator can receive a database stored in SQL with at least the fields user ID, event, and timestamp, and convert the fields into Python action files for users.

In some embodiments, one or more rules can be applied to the simulated user bot database translator. For example, the simulated user bot database translator can derive the browser application used by a particular user by searching through the information provided in a given browser tab if the information is not provided otherwise. In another example, the simulated user bot database translator can perform the search with the same service as a given user by searching through the information contained in the browser tab unless the information is provided in another field. In yet another example, the simulated user bot database translator can search through the browser tab for information regarding the email service used unless provided explicitly by the dataset in the database. In a further example, the simulated user bot database translator can search a social media site specified in the browser tab unless otherwise provided in the dataset in the database. In another further example, the simulated user bot database translator can browse to the website referred to if the browser tab contains a full HTTP URL. It should be noted that any suitable number and any suitable combination of rules can be applied to the simulated user bot database translator to create action files.

In continuing this example, upon translating the database into action files for each of the users (or user accounts), process 600 can select one or more of these action files for use in generating simulated user bots. For example, process 600 can analyze the records associated with each user in the action files and determine to remove particular users. By removing particular users and their associated action files, process 600 can obtain a set of baseline actions for users.

In some embodiments, process 600 can generate a modified action file by adding noise or changing normal behavior of an action file such that a user appears malicious. These modified action files can, for example, be used to generate a simulated user bot.

Alternatively, in systems in which malicious/compromised computers 110 and/or attacking computer systems 116 are present and detected by detection system 114, process 600 can analyze the user activity information associated with these computing systems and generate one or more simulated user bots that emulate a malicious user. It should be noted that each simulated user bot can include a different set and/or varying levels of malicious user activities. As such, process 600 can inject multiple simulated user bots that mimic different types of malicious users in order to determine whether a particular type of malicious user or a particular action by a malicious user may evade detection by detection system 114.

Alternatively, in some embodiments, process 600 can derive general parameters for the users from the action files and use the derived general parameters to provide actions for the generation of a simulated user bot. For example, for a social media site visit, process 600 can receive a specified list of the top ten social media sites and can arbitrarily or randomly select one social media site for a particular user and then calculate how long a user should spend on that given site based on the history of how long other users spent on that particular site in the past. This random selection process that is used to provide actions for generating simulated user bots can cause a simulated user to be unique from another simulated user.

Referring back to FIG. 6, process 600 can generate one or more simulated user bots using the action files at 606. Such a simulated user bot can perform a task that a regular user would perform, such as logging into an account, sending an email, opening a website, creating and modifying a document, etc. In the case of an administrative user, a simulated user bot can verify the detection mechanisms of an insider threat detection system, place decoy documents within a computing environment, update security appliances and determine whether the recently updated security appliance is provided expected results, etc.

Figure 7:
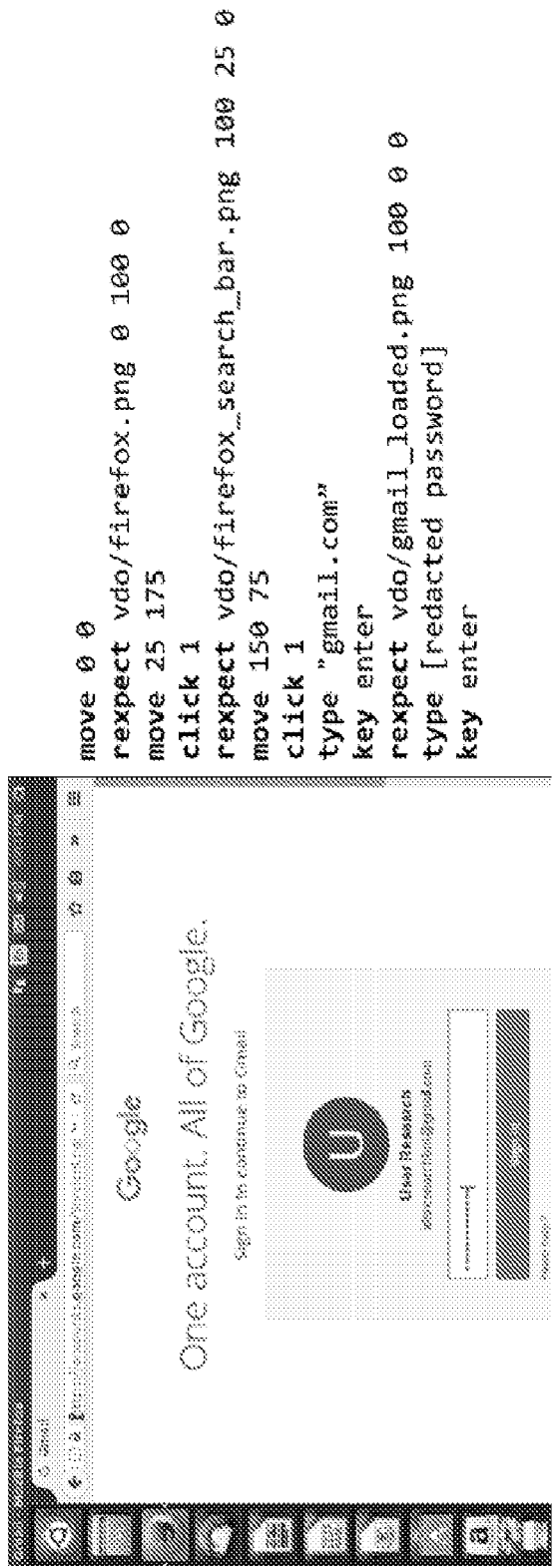
FIG. 7 is a diagram showing an illustrative example of threats, behaviors, indicators, and detectors in accordance with some embodiments of the disclosed subject matter.

In a more particular example, an example of a script and action in a formal language that specifies a sequence of user activity is shown in FIG. 7. As shown in FIG. 7, particular actions and/or modified actions of an actual user can be mapped to the constructs of the formal language. It should be noted that the formal language shown in FIG. 7 can be used to differentiate between different types of user activity. For example, in analyzing the timestamps of the monitored user activity, process 600 can determine a gap between activities. It should be noted that process 600 can determine that it is unrealistic to assume that a user proceeds directly from one task to the next without a pause. The delta in time between activities in the database can allow process 600 to train simulated user bots to have pauses between actions, thereby improving the overall realism of a simulated user bot. In some embodiments, one or more checks can be provided to determine whether a prescribed action has completed execution and that the computing system is in an expected stated prior to continuing to the next action. If such a check fails, process 600 can attempt to execute the action again prior to continuing on to the subsequent actions.

It should be noted that simulated user bots can be generated and injected into a computing environment, such that they are generally identical to users in many facts from having to login to the speed at which a user edits a document.

In some embodiments, once the simulated user activity is generated, one or more models can be applied. For example, the simulated user activity can be tuned to one or more biometric models for keystroke speed, mouse speed, mouse distance, and the frequency of errors made by a user when typing. These parameters function as controls over the formal language and assist in creating variability in the simulations. Depending on the particular simulation, other parameters such as uniform resource locators (URLs) or other text that must be typed are then entered to adapt each action.

In some embodiments, one or more features, such as keycodes (e.g., the ASCII code representing a key), the duration for which a key is pressed, keystroke error rates, mouse movement speed, and mouse movement distance, can be recorded for the construction of one or more user models or biometric models. For example, generative models for keystroke timing can be created by dividing the recorded data for each keycode pair into separate classes, where each class is determined by the distance in standard deviations from the mean. The distribution for each keycode sequence can be calculated as the number of instances of each class. Simulation keystroke timing can be adapted to profiles of individual users by generating random times that are bounded by the class distribution.

It should be noted that, in some embodiments, alternative applications can be executed by the simulated user bot in place of a software application executed by a monitored user. For example, in response to detecting that an action file of a user includes the execution of a commercial software application (e.g., Microsoft Office), process 600 can replace the execution of the commercial software application with an open source equivalent that corresponds to the commercial software application (e.g., Apache OpenOffice). This can, for example, not compromise the realism of the simulated user bot while avoiding potential software licensing issues.

Referring back to FIG. 6, the one or more simulated user bots can be injected into a computing environment at 608.

As shown in FIGS. 2-5, the simulated user bots can be injected using any suitable number of approaches. Referring back to FIG. 2, simulation and injection component (VM-Sim) 210 transmits the simulated user bots into the guest operating system 260. In a more particular example, simulation and injection component 210 obtains access to the display of guest operating system 260 to play back the simulated user activity of a simulated user bot. During playback, simulation and injection component 210 can automatically detect the position of the virtual machine window and adjust the coordinates to reflect the changes of the simulated user activity. Alternatively, a simulated user bot can use simulation and injection component 210 to transmit decoy information into a suitable buffer.

In some embodiments, as shown in FIG. 4, the simulated user bot can be injected by simulating Bluetooth input devices. In selecting the Bluetooth protocol, the physical proximity of the workstations to one another within a typical workspace can be leveraged. More particularly, a Bluetooth proxy application can be used to transmit the simulated user activity. The Bluetooth proxy application can receive user activity from GNU Xnee or any other suitable function, modify and translate the user actions to the Bluetooth human interface devices (HID) protocol, and transmit the simulated user activity into a host.

Alternatively or additionally, in the thin client environment of FIG. 5, remote access protocols (e.g., Citrix, VNC, etc.) can be used to inject the simulated user activity of a simulated user bot. A testing system can be deployed as a thin client that periodically connects to each hosted virtual machine and injects simulated user bots.

It should be noted that simulated user bots that emulate the behavior of normal users can be injected along with simulated user bots that emulate the behavior of malicious users. This can, for example, support the believability of the simulated user activity. This can also, for example, be used to determine whether a detection system detects the simulated user activity performed by a simulated user bot that is emulating the behavior of a malicious user as opposed to the simulated user activity performed by a simulated user bot that is emulating the behavior of a normal user.

In some embodiments, the simulated user bot that has been injected into the computing environment can be modified from emulating the behavior of a normal user having a normal user type to the behavior of a malicious user having an abnormal user type. This can, for example, be used to evaluate whether the detection system detects the simulated user activity of the simulated user bot in response to the modified behavior and, if it does detect the modified user activity, it can be determined how long it takes and the computational resources expended to make such a detection.

In some embodiments, in response to injecting one or more simulated user bots into the computing environment, process 600 can record the logs at the end of a run by a simulated user bot. It should be noted that, in some embodiments, a virtual connection is used to ensure that there are no extraneous activities conducted locally and recorded in such logs.

After the data has been generated from a simulated user bot, process 600 can analyze the recorded data that would trigger user anomaly detectors at 610, such as an insider threat detection system. An illustrative example of threat types, behaviors, indicators, and detectors are shown, for example, in FIG. 8.

It should be noted that the user anomaly detectors for detecting anomalous behavior can include, for example, a Gaussian mixture model, a support vector machine, and/or a Bayesian network.

For example, a Gaussian mixture model used in user anomaly detectors is a probabilistic model, which can be represented by:

$$p(x \mid \lambda) = \sum_{i=1}^{M} w_i g(x \mid \mu_i, \Sigma_i),$$

where x is a D-dimensional continuous value data vector, $w_i$ are mixture weights and go are component Gaussian densities. It should be noted that these Gaussian Mixture Models include the covariance structure of the data.

In another example, support vector machines used in user anomaly detectors can generally include supervised classifiers that attempt to map input vectors into a high dimensional feature space using optimal hyperplanes, those with the maximal margin between the vectors of the two classes, for separable classes. Support vector machines can attempt to find a function that is positive on a subset of the input space and negative on the complement by mapping the input data into a higher dimensional space and using the origin as a negative training point. The objective function can be represented by:

$$\min_{w \in F, \xi \in R^l, \rho \in R} \frac{1}{2} \|w\|^2 + \frac{1}{vl} \sum_i \xi_i - \rho$$

$$\text{s.t.} \quad (w \cdot \Phi(x_i)) \geq \rho - \xi_i, \xi_i \geq 0$$

where v can be a parameter between 0 and 1 that controls how tightly the support vector machine fits the data.

Figure 9:
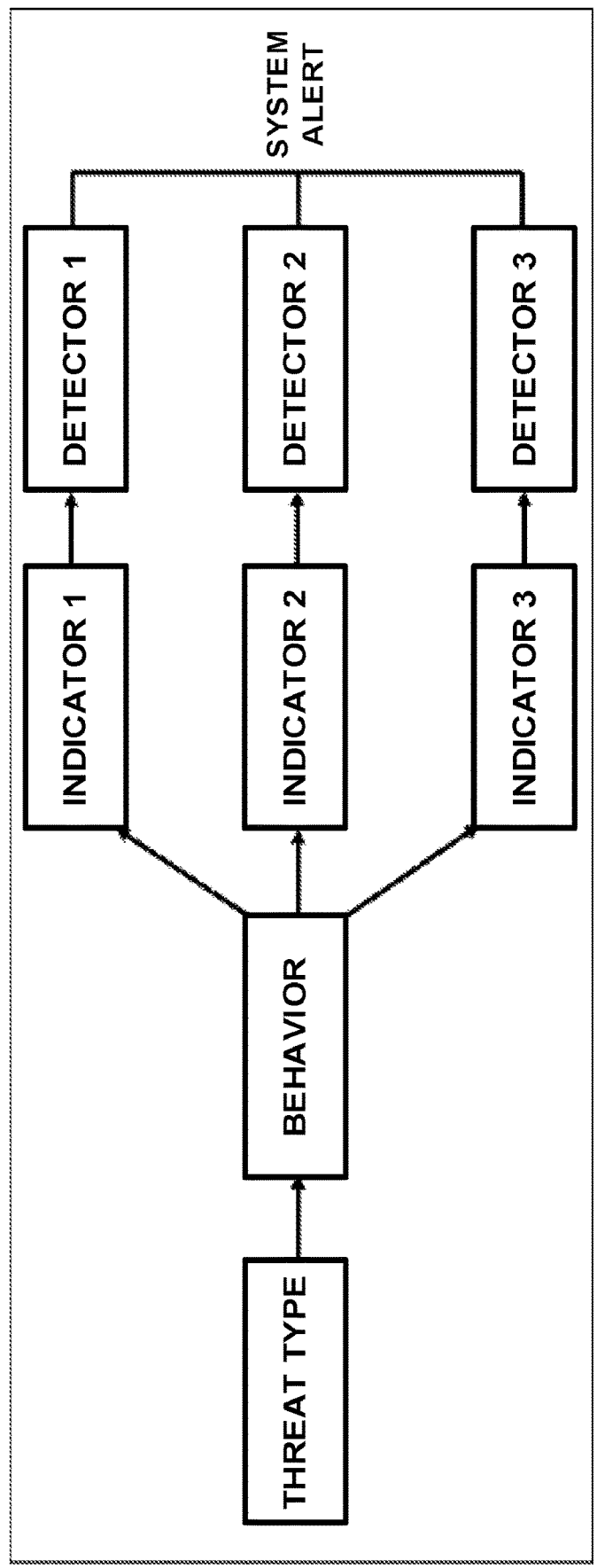
FIG. 9 is an illustrative example of how a Bayesian network can be used to model a threat type, behavior, indicators, and detectors in accordance with some embodiments.

In yet another example, Bayesian networks used in user anomaly detectors can make use of probabilistic relationships among variables of interest in an acyclic graphical model. For example, FIG. 9 shows an illustrative example of how such a Bayesian network can be used to model a threat type, behavior, indicators, and detectors. A Bayesian network can be represented as follows:

$$P(X_1, X_2, \ldots, X_n) = \prod_{i=1}^{n} P(X_i \mid \pi_i)$$

where $X_1, X_2, \ldots,$ and $X_n$ represent random variables and $\pi_i$ is the set of parents of $X_i$.

In some embodiments, the simulated user bots described herein can be configured to generate trace data, which can be used as indicators and detectors in identifying malicious users by insider threat detection systems. These indicators can be temporal statistics derived from an analysis of monitored network logs. These statistics derive group norms from which abnormal users are identified. Controlling the pace and frequency of these trace indicators generated by a simulated user bot can be used to test the insider threat detection system at its margins. This can, for example, provide a detailed analysis of the ease of evading detection by the insider threat detection system. Moreover, errors in the deployed monitoring infrastructure, either due to bugs in configurations or noise introduced by faulty sensors, can also be revealed if a simulated user bot if undetected (e.g., although directed to purposely exhibit the indicator).

In a more particular example, process 600 can use the challenge problems from an external third party operating and analyzing a deployed insider threat solution as a guide to set a threat type, behavior, indicators, and detectors. For example, the threat type can be defined as individuals using their computing devices with abnormal work habits, where the behavior associated with this threat is a user who uses their computing device outside of normal work hours (e.g., between 5:00:01 PM and 6:59:59 AM EST). Three illustrative indicators of this behavior can be: 1) in the top five percent of the daily frequency average distribution of Google or Bing searches conducted between 5:00:01 PM and 6:59:59 AM EST; 2) in the top five percent of the daily frequency average distribution of social media website visits between 5:00:01 PM and 6:59:59 AM EST; and 3) in the top five percent of the daily frequency average distribution of actions on files and documents between 5:00:01 PM and 6:59:59 AM EST. This, in turn, can correspond to the following three detectors: 1) at least 13 log entries for a Google or Bing search conducted between 5:00:01 PM and 6:59:59 AM EST; 2) at least 61 log entries for a social media website visit between 5:00:01 PM and 6:59:59 AM EST; and 3) at least 90 log entries for actions on files and documents between 5:00:01 PM and 6:59:59 AM EST.

In continuing this example, anomalous users can be selected from the dataset and, in some cases, a subset of the anomalous users can be selected (e.g., by random selection). The user activities associated with the selected users can, for example, be supplemented with behaviors to appear anomalous. A simulated user bot based on the modified actions of an anomalous user can be executed within a computing environment in which a detection system is monitoring the computing environment (e.g., one of the Gaussian mixture model, the support vector machine, the Bayesian network). In response, process 600 can determine whether each of the detection systems detected the injected malicious or anomalous user bot.

It should be noted that simulated user bots having differing levels of maliciousness can be generated to continue to test these detection systems. For example, in response to determining that a malicious user bot has not been detected by a particular detection system, process 600 can transmit a notification that indicates parameters for improving the performance of the detection system at 612. In another example, in response to determining that a malicious user bot has been detected by a particular detection system, process 600 can continue to modify the simulated user actions until the detection system fails to detect the simulated user actions as being anomalous. In this example, the testing mechanisms described herein can determine the bounds of a detection system and can, for example, transmit a notification that indicates parameters that may be used to evade detection, thereby allowing an administrative user to modify the detection system such that detection is not evaded. In a more particular example, the notification can include a modification to an indicator or rule applied by the detection system such that detection of a simulated user bot would not be evaded.

This can, for example, provide a detailed analysis of the ease of evading detection by the insider threat detection system. Moreover, errors in the deployed monitoring infrastructure, either due to bugs in configurations or noise introduced by faulty sensors, can also be revealed if a simulated user bot if undetected (e.g., although directed to purposely exhibit the indicator).

In some embodiments, the simulated user bots can be used to measure the computational cost of maintaining temporal statistics, where the measurements can be included in the notification at 612. For example, low and slow behaviors may cause an insider threat detection system to maintain long term state information for many users, which causes an increasing cost in terms of storage and computation. Accordingly, the use of simulated user bots can provide an approach for evaluating the accuracy of an insider threat detection system and its computational costs.

It should be noted that, although the embodiments described herein generally relate to testing detection systems, such as an insider threat detection system, and whether such detection systems detect the actions of a simulated user bot that is emulating a malicious user or an insider attacker, this is merely illustrative.

In some embodiments, the simulated user bots can be injected into a computing environment to perform verification tasks within the computing environment. For example, a simulated user bot can monitor the user actions of an administrative user (e.g., or any suitable user having a particular level of authorizations or permissions within the computing environment) and can perform particular verification tasks, such as automatically updating the configuration of a security appliance and determine whether the newly configured security appliance provides an expected state. In continuing this example, the simulated user bots can test the outcome of such changes to the security appliance by, for example, determining whether the state of the computing environment matches an expected state of the computing environment based on the injected actions. In another example, the simulated user bots can determine whether the newly configured security appliance detected one or more actions injected by the simulated user bots into the computing environment.

For example, process 600 can continue by performing a verification that includes determining whether state information of the application or security appliance matches an expected state after the simulated user activity is injected. Process 600 verifies the success or failure of user events that are passed to, for example, a guest operating system. For example, in some embodiments, a visual verification can be performed by determining whether the screen output changed in response to simulated user activity (e.g., with respect graphical artifacts or pixel selections).

In some embodiments, the simulated user bots can perform security tasks within a computing environment. For example, the mechanisms can use the simulated user bots to inject actions that emulate a user of a particular user type (e.g., an administrative user) into the computing environment, where the injected actions of such an administrative user can place decoy information in one or more particular locations within the computing environment. The use of simulated user bots to place decoy information can, for example, distribute detection capabilities for detecting the exfiltration of data or documents.

Accordingly, methods, systems, and media for testing insider threat detection systems are provided.

Any suitable hardware and/or software can be used to perform the mechanisms described herein. For example, a general purpose device such as a computer or a special purpose device such as a client, a server, etc. can be used to execute software for performing the mechanisms described herein. Any of these general or special purpose devices can include any suitable components such as a hardware processor (which can be a microprocessor, digital signal processor, a controller, etc.), memory, communication interfaces, display controllers, input devices, etc. This hardware and/or software can be implemented as part of other equipment or can be implemented as stand-alone equipment (which can be coupled to other equipment).

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for testing insider threat detection systems, the method comprising:
receiving, using a hardware processor, a first plurality of actions in a computing environment that are associated with one of a plurality of user accounts;
generating a plurality of models of user behavior based at least in part on the first plurality of actions, wherein each of the plurality of models of user behavior is associated with each of the plurality of user accounts;

selecting a model of user behavior from the plurality of models of user behavior, wherein the model of user behavior is associated with a malicious user type;

generating a simulated user bot based on the selected model of user behavior;

executing the simulated user bot in the computing environment, wherein the simulated user bot injects a second plurality of actions in the computing environment;

determining whether an insider threat detection system executing within the computing environment identifies the simulated user bot as a malicious user; and transmitting a notification indicating an efficacy of the insider threat detection system based on the determination.

2. The method of claim 1, wherein each of the first plurality of actions includes a user identifier associated with one of the plurality of user accounts, an event, and a timestamp for the event.

3. The method of claim 1, wherein each of the first plurality of actions includes a description of the event.

4. The method of claim 1, wherein the description of the event includes at least one of search terms and page visitation information.

5. The method of claim 1, wherein at least one of the first plurality of actions includes a user selection of one or more particular documents in the computing environment.

6. The method of claim 1, further comprising classifying each of the first plurality of user actions into a category of a plurality of categories of user actions.

7. The method of claim 1, further comprising:
storing the first plurality of actions in a storage device;
translating the first plurality of actions in the storage device by applying a plurality of rules; and
generating an action file for each of the plurality of user accounts based on the translated plurality of actions.

8. The method of claim 7, further comprising modifying the action file by removing at least one of the first plurality of actions.

9. The method of claim 1, further comprising:
deriving user parameters based on the translated plurality of actions; and
generating an action file based on the derived user parameters.

10. The method of claim 1, wherein the user parameters are derived from a subset of actions that are randomly selected from the translated plurality of actions.

11. The method of claim 1, further comprising:
creating a user account in the computing environment; and
introducing the simulated user bot into the computing environment using the created user account.

12. The method of claim 1, further comprising analyzing the second plurality of actions by determining whether the insider threat detection system identifies the simulated user bot as the malicious user.

13. The method of claim 1, wherein the insider threat detection system is implementing an anomaly detection model that includes one of: a Gaussian model, a support vector machine model, and a Bayesian network model.

14. The method of claim 1, further comprising:
modifying the simulated user bot; and
determining an efficacy score of the insider threat detection system based on detections of the simulated user bot and the modified simulated user bot.

15. The method of claim 1, wherein the first plurality of actions in the computing environment are associated with an administrative user account and wherein the simulated user bot emulates the user behavior of the administrative user account by inserting a plurality of decoy documents into the computing environment.

16. The method of claim 1, wherein the first plurality of actions in the computing environment are associated with an administrative user account and wherein the simulated user bot emulates the user behavior of the administrative user account by automatically updating a security appliance within the computing environment and determining whether the updated security appliance generates expected state information.

17. A system for testing insider threat detection systems, the system comprising:
a hardware processor that is configured to:
receive a first plurality of actions in a computing environment that are associated with one of a plurality of user accounts;
generate a plurality of models of user behavior based at least in part on the first plurality of actions, wherein each of the plurality of models of user behavior is associated with each of the plurality of user accounts;
select a model of user behavior from the plurality of models of user behavior, wherein the model of user behavior is associated with a malicious user type;
generate a simulated user bot based on the selected model of user behavior;
execute the simulated user bot in the computing environment, wherein the simulated user bot injects a second plurality of actions in the computing environment;
determine whether an insider threat detection system executing within the computing environment identifies the simulated user bot as a malicious user; and
transmit a notification indicating an efficacy of the insider threat detection system based on the determination.

18. A non-transitory computer-readable medium containing computer-executable instructions that, when executed by a processor, cause the process to perform a method for testing insider threat detection systems, the method comprising:
receiving a first plurality of actions in a computing environment that are associated with one of a plurality of user accounts;
generating a plurality of models of user behavior based at least in part on the first plurality of actions, wherein each of the plurality of models of user behavior is associated with each of the plurality of user accounts;
selecting a model of user behavior from the plurality of models of user behavior, wherein the model of user behavior is associated with a malicious user type;
generating a simulated user bot based on the selected model of user behavior;
executing the simulated user bot in the computing environment, wherein the simulated user bot injects a second plurality of actions in the computing environment;
determining whether an insider threat detection system executing within the computing environment identifies the simulated user bot as a malicious user; and transmitting a notification indicating an efficacy of the insider threat detection system based on the determination.

* * * * *